(12) United States Patent
Endo et al.

(10) Patent No.: US 8,374,303 B2
(45) Date of Patent: Feb. 12, 2013

(54) CLOCK SYNCHRONIZATION CIRCUIT AND SEMICONDUCTOR DEVICE PROVIDED THEREWITH

(75) Inventors: Masami Endo, Kanagawa (JP); Daisuke Kawae, Kanagawa (JP); Yoshiyuki Kurokawa, Kanagawa (JP); Takayuki Ikeda, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 928 days.

(21) Appl. No.: 11/820,245

(22) Filed: Jun. 19, 2007

(65) Prior Publication Data
US 2008/0012616 A1 Jan. 17, 2008

(30) Foreign Application Priority Data
Jun. 30, 2006 (JP) ................................. 2006-181966

(51) Int. Cl.
*H04L 7/00* (2006.01)
(52) U.S. Cl. .......................... 375/354; 327/141; 370/503
(58) Field of Classification Search ................... 375/354
See application file for complete search history.

(56) References Cited

U.S. PATENT DOCUMENTS

| | | | |
|---|---|---|---|
| 4,694,196 A | 9/1987 | Hasley et al. | |
| 5,987,339 A * | 11/1999 | Asano | 455/574 |
| 6,021,503 A | 2/2000 | Pax et al. | |
| 6,134,285 A | 10/2000 | Lo | |
| 6,359,943 B1 | 3/2002 | Lo | |
| 6,765,972 B1 * | 7/2004 | Kawasaki et al. | 375/329 |
| 2001/0010670 A1 * | 8/2001 | Jinbo et al. | 369/47.28 |
| 2001/0014922 A1 * | 8/2001 | Kuge | 710/36 |
| 2002/0152044 A1 | 10/2002 | Shanks et al. | |
| 2004/0100312 A1 * | 5/2004 | Cho | 327/158 |
| 2004/0264620 A1 | 12/2004 | Tanaka | |
| 2005/0133605 A1 | 6/2005 | Koyama et al. | |
| 2005/0195326 A1 * | 9/2005 | Kudou | 348/465 |
| 2005/0210302 A1 | 9/2005 | Kato et al. | |

(Continued)

FOREIGN PATENT DOCUMENTS

| | | |
|---|---|---|
| EP | 1 158 457 A1 | 11/2001 |
| JP | 8-8892 | 1/1996 |

(Continued)

OTHER PUBLICATIONS

Kurokawa, Y. et al, "UHF RFCPUs on Flexible and Glass Substrates for Secure RFID Systems," Session 32/TD: Trends in Wireless Systems/32.4, IEEE International Solid-State Circuits Conference, ISSCC 2007 Digest of Technical Papers, Feb. 14, 2007, pp. 574-575.
Search Report re European application No. EP 07011473.1, dated Jun. 22, 2012.

*Primary Examiner* — Erin File
(74) *Attorney, Agent, or Firm* — Husch Blackwell LLP

(57) ABSTRACT

An object is to provide a clock synchronization circuit capable of stable communication even in the case where different clock signals are used in a plurality of circuits, and a semiconductor device provided therewith. Circuit for detecting a change point of received data, and outputting a reset signal; reference clock generating means for generating a clock signal; and circuit for counting the clock signals outputted from the reference clock generation means, and resetting a counter value obtained by counting the clock signals in the case where the reset signal is inputted are provided.

8 Claims, 19 Drawing Sheets

U.S. PATENT DOCUMENTS

| | | | |
|---|---|---|---|
| 2005/0223148 A1* | 10/2005 | Kim | 710/260 |
| 2006/0006985 A1 | 1/2006 | Ziebertz | |
| 2006/0023822 A1 | 2/2006 | Castle | |
| 2006/0190849 A1* | 8/2006 | Nakatsu et al. | 716/2 |
| 2006/0267690 A1 | 11/2006 | Osada | |
| 2008/0001876 A1* | 1/2008 | Ito et al. | 345/87 |

FOREIGN PATENT DOCUMENTS

| | | |
|---|---|---|
| JP | 2001-352317 | 12/2001 |

\* cited by examiner

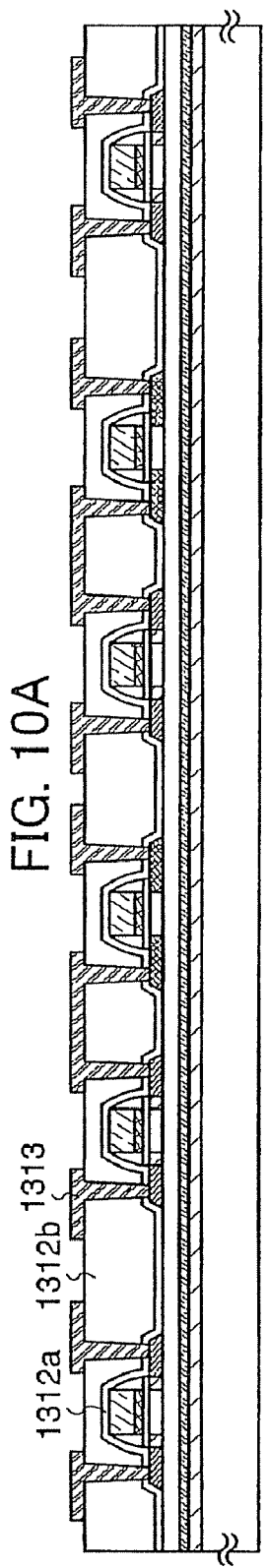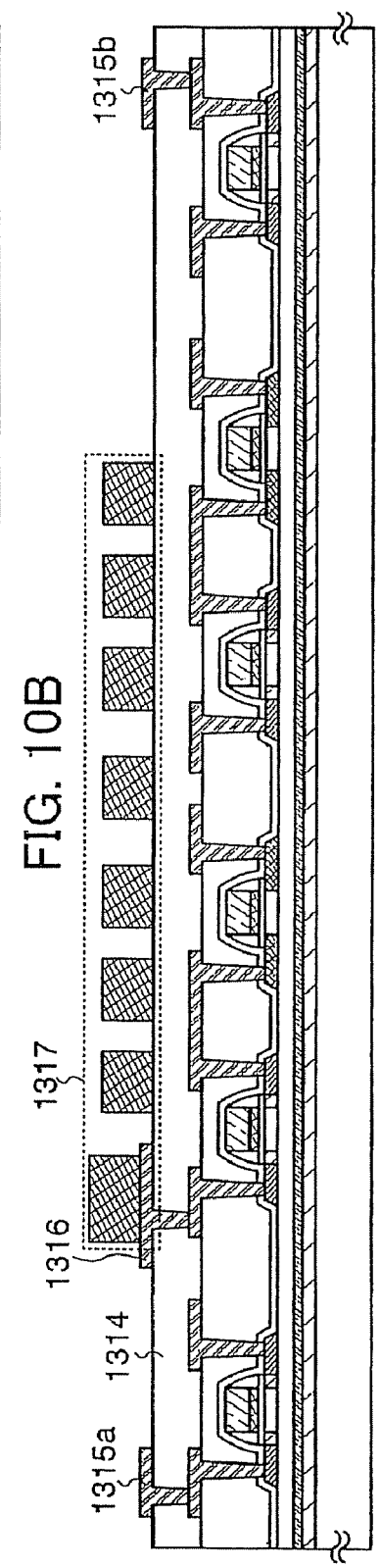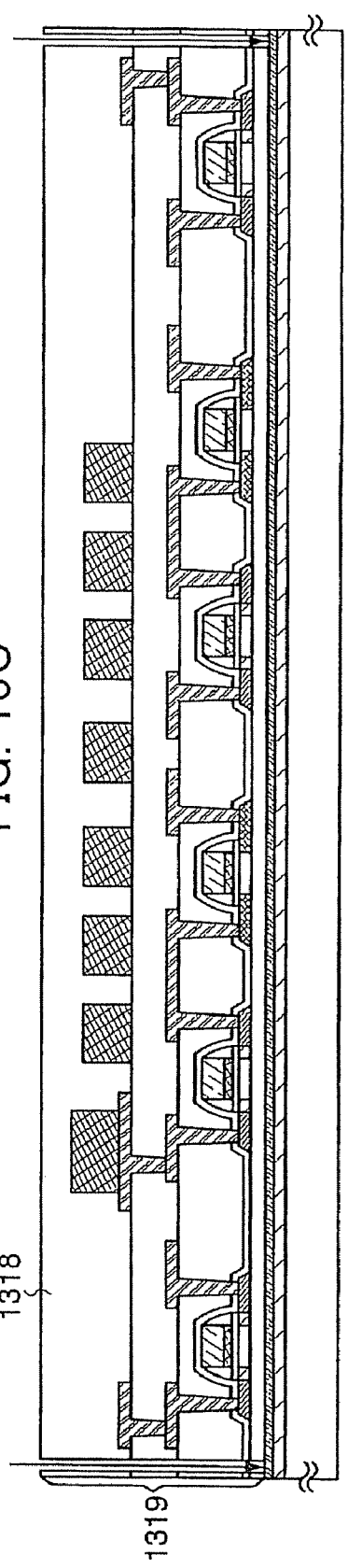

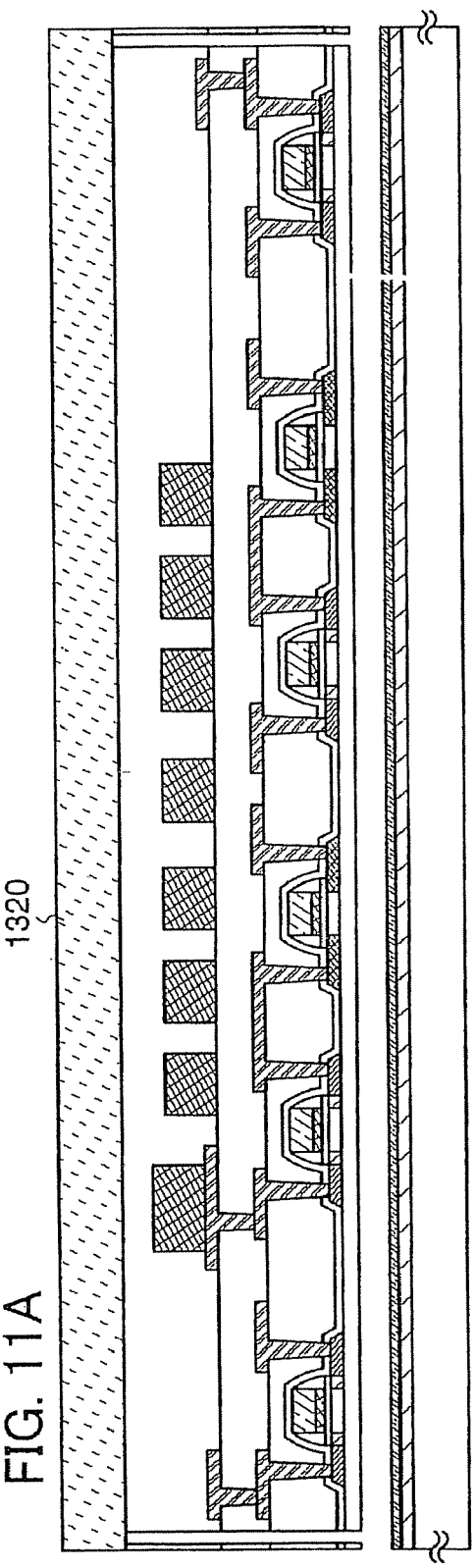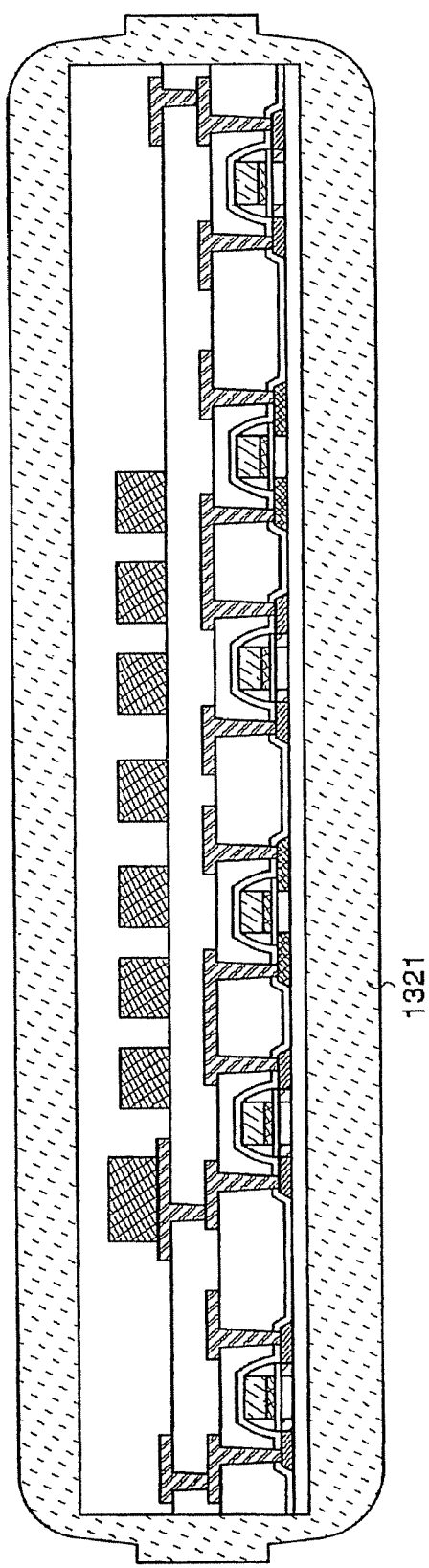

CLOCK SYNCHRONIZATION CIRCUIT AND SEMICONDUCTOR DEVICE PROVIDED THEREWITH

BACKGROUND OF THE INVENTION

1. Field of the Invention

The present invention relates to a clock synchronization circuit and a semiconductor device provided therewith in the case of using a plurality of kinds of clocks.

2. Description of the Related Art

In recent years, with the diffusion of the Internet, IT (Information Technology) has been spread all over the world, and a revolutionary change has been brought about. In particular, it is called ubiquitous information society that an environment in which anywhere at anytime can access the network has been put into place. In such an environment, by giving each object an ID (individual identification number), an individual identification technique in which, for example, history of the object becomes clarified and is made use of for manufacturing, management, or the like has attracted attention these days. Among this, in particular, a semiconductor device capable of transmitting and receiving signals wirelessly such as an RFID (Radio Frequency IDentification) tag (also referred to as an ID tag, an IC tag, an IC chip, an RF tag, a wireless tag, a wireless chip, or an electronic tag) has been introduced on a trial basis to corporations, markets, and the like.

Such a semiconductor device performs an operation based on a signal received from a reader/writer, and specifically, a signal outputted from a transmitting circuit provided in the reader/writer is inputted to a receiving circuit provided in a semiconductor device such as an RFID tag.

For example, the following case is considered: a data signal is transmitted from a transmitting circuit 410 provided with a reference clock generation circuit 411 and a data signal generating circuit 412 to a receiving circuit 420 provided with a reference clock generation circuit 421, a frequency divider circuit 423, and a reference clock generation circuit 424 for receiving circuit operation (FIG. 5). In this case, a clock signal is generated by the reference clock generation circuit 411 in the transmitting circuit 410, and a clock signal is generated by the reference clock generation circuit 421 in the receiving circuit 420. Then, a data signal (a data signal 402 or a data signal 404), which is in synchronization with the clock signal generated by the reference clock generation circuit 411 in the transmitting circuit 410, is inputted to a logic circuit 422 in the receiving circuit 420, and latched by the clock signal generated by the reference clock generation circuit 424 for receiving circuit operation.

In general, in the case where signals are transmitted and received between the transmitting circuit 410 provided in an external reader/writer or the like and the receiving circuit 420 provided in an RFID tag or the like, signals are transmitted and received using clock signals which differ from circuit to circuit.

SUMMARY OF THE INVENTION

In the case where different clock signals are used in a plurality of circuits (e.g., in a transmitting circuit and a receiving circuit), a data signal in each circuit is in synchronization with a clock signal of each circuit. As a result, there are the case where a change point of a data signal and a change point of a clock signal in a circuit which receives the data signal are overlapped with each other, and the case where the change points are adjacent to each other. Accordingly, in the case of receiving a data signal, there occurs a problem in which set-up time and hold time of a data signal do not be constant.

For example, FIG. 6 shows a timing chart of the case where a data signal (here, the "data signal 402" or the "data signal 404") which is inputted from the transmitting circuit 410 to the receiving circuit 420 deviate with respect to a reference clock signal 401 for receiving circuit operation, generated by the reference clock generation circuit 424 for receiving circuit operation in the receiving circuit 420.

In this case, a logical value 403 corresponding to the data signal 402 in the case where the change timing of the data signal inputted from the transmitting circuit 410 to the receiving circuit 420 is earlier than the rise timing of the reference clock signal 401 for receiving circuit operation by a certain period 406, and a logical value 405 corresponding to the data signal 404 in the case where the change timing of the data signal inputted from the transmitting circuit 410 to the receiving circuit 420 is later than the rise timing of the reference clock signal 401 for receiving circuit operation by a certain period 407 are outputted. That is, when a data signal inputted from the transmitting circuit 410 to the receiving circuit 420 is earlier or later than the reference clock signal 401 for receiving circuit operation, a logical value which is judged at a rise edge of the reference clock signal 401 for receiving circuit operation is outputted differently.

In this way, there has been a problem in that a logical value is different at the rise timing of a reference clock signal for receiving circuit operation and a circuit operation is unstable when the change timing of a data signal inputted from a transmitting circuit to a receiving circuit is earlier or later than the rise timing of the reference clock signal for receiving circuit operation.

In view of the foregoing problem, an object of the present invention is to provide a clock synchronization circuit capable of stable communication even in the case where different clock signals are used in a plurality of circuits, and a semiconductor device provided therewith.

One feature of a clock synchronization circuit of the present invention includes: means for detecting a change point of received data, and outputting a reset signal; a reference clock generation circuit for outputting a clock signal; and a reference clock counter circuit for counting the clock signals, in which the reference clock counter circuit resets a counter value obtained by counting the clock signals in the case where the reset signal is inputted.

Another feature of a clock synchronization circuit of the present invention includes: means for detecting a change point of received data, and outputting a reset signal; a reference clock counter circuit for counting the clock signals; a frequency divider circuit for frequency-dividing a signal outputted from the reference clock counter circuit; and means for outputting a reference clock signal for circuit operation with a signal outputted from the frequency divider circuit, in which the reference clock counter circuit resets a counter value obtained by counting the clock signals in the case where the reset signal is inputted.

Another feature of a clock synchronization circuit of the present invention includes: a data signal counter circuit for detecting a change point of a received data signal; a counter value comparator to which a signal outputted from the data signal counter circuit is inputted; a reference clock generation circuit for outputting a clock signal; a reference clock counter circuit for counting the clock signals; a frequency divider circuit for frequency-dividing a signal outputted from the reference clock counter circuit; and means for outputting a reference clock signal for circuit operation with a signal outputted from the frequency divider circuit, in which the counter value comparator outputs a reset signal in accordance with a signal outputted from the data signal counter circuit; and the reference clock counter circuit resets a counter value obtained by counting the clock signals with the reset signal.

One feature of a semiconductor device of the present invention is a semiconductor device provided with an antenna, which transmits and receives signals to and from a reader/writer by wireless communication, including: means for detecting a change point of a data signal which is received from the reader/writer, and outputting a reset signal; a reference clock generation circuit for outputting a clock signal; and a reference clock counter circuit for counting the clock signals, in which the reference clock counter circuit resets a counter value obtained by counting the clock signals in the case where the reset signal is inputted.

Another feature of a semiconductor device of the present invention is a semiconductor device provided with an antenna, which transmits and receives signals to and from a reader/writer by wireless communication, including: means for detecting a change point of a data signal which is received from the reader/writer, and outputting a reset signal; a reference clock counter circuit for counting the clock signals; a frequency divider circuit for frequency-dividing a signal outputted from the reference clock counter circuit; and means for outputting a reference clock signal for circuit operation with a signal outputted from the frequency divider circuit, in which the reference clock counter circuit resets a counter value obtained by counting the clock signals in the case where the reset signal is inputted.

Another feature of a semiconductor device of the present invention is a semiconductor device provided with an antenna, which transmits and receives signals to and from a reader/writer by wireless communication, including: a data signal counter circuit for detecting a change point of a data signal which is received from the reader/writer; a counter value comparator to which a signal outputted from the data signal counter circuit is inputted; a reference clock generation circuit for outputting a clock signal; a reference clock counter circuit for counting the clock signals; a frequency divider circuit for frequency-dividing a signal outputted from the reference clock counter circuit; and means for outputting a reference clock signal for circuit operation with a signal outputted from the frequency divider circuit, in which the counter value comparator outputs a reset signal in accordance with a signal outputted from the data signal counter circuit; and the reference clock counter circuit resets a counter value obtained by counting the clock signals with the reset signal.

According to the present invention, stable communication can be provided even in the case where a data signal is inputted and outputted between circuits operating with different clock signals. In addition, by using a clock synchronization circuit of the present invention, the whole receiving circuit operates with a reference clock for receiving circuit operation; therefore, the calculation of delay time is easily performed and circuit is easy designed.

BRIEF DESCRIPTION OF THE DRAWINGS

FIGS. 10A to 10C are diagrams illustrating an example of a manufacturing method of a semiconductor device of the present invention.

FIGS. 11A and 11B are diagrams illustrating an example of a manufacturing method of a semiconductor device of the present invention.

DETAILED DESCRIPTION OF THE INVENTION

Figure 1:
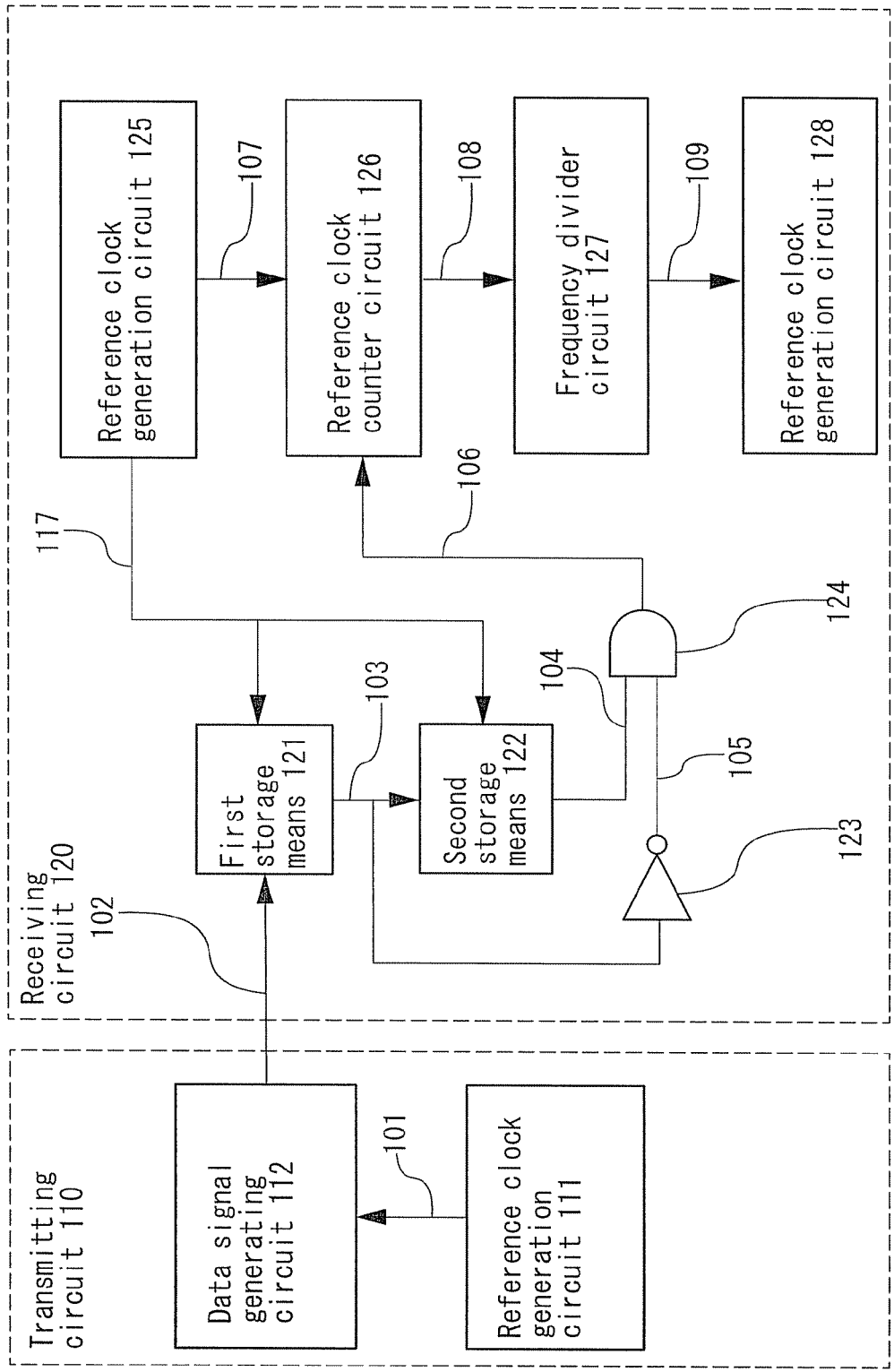
FIG. 1 is a diagram illustrating an example of a clock synchronization circuit of the present invention.

Hereinafter, embodiment modes of the present invention will be described with reference to the accompanying drawings. However, the present invention is not limited to the following description. As is easily known to a person skilled in the art, the mode and the detail of the present invention can be variously changed without departing from the spirit and the scope of the present invention. Thus, the present invention is not interpreted as being limited to the following description of the embodiment modes. Note that the same reference numeral may be used to denote the same component among the different drawings in structures of the present invention explained below.

Embodiment Mode 1

This embodiment mode will describe an example of a clock synchronization circuit of the present invention with reference to drawings.

A clock synchronization circuit of the present invention includes means for detecting a change point of a received data signal (a signal including particular data) and outputting a reset signal, reference clock generation means for generating a clock signal, and means for counting the clock signals outputted from the reference clock generation means and resetting a counter value obtained by counting the clock signals in the case where the reset signal is inputted. In addition, reference clock signal generation means for receiving circuit operation outputs a clock signal to serve as a standard for operating a receiving circuit in accordance with the count of the clock signals. Hereinafter, a specific structure and the like will be described.

FIG. 1 is a block diagram of a clock synchronization circuit. The clock synchronization circuit shown in FIG. 1 includes first storage means 121, second storage means 122, means 123 for generating an inverted signal 105 of a signal 103 outputted from the first storage means 121, means 124 for comparing a signal 104 outputted from the second storage means 122 and an inverted signal 105 of a signal 103 outputted from the first storage means 121, a reference clock generation circuit 125, a reference clock counter circuit 126, a frequency divider circuit 127, and a reference clock generation circuit 128 for receiving circuit operation. Note that a reference clock signal for receiving circuit operation which is generated by the reference clock generation circuit 128 for receiving circuit operation is outputted to a circuit such as a logic circuit for forming a part of a semiconductor device.

Shown here is an example in which latch circuits are used for the first storage means 121 and the second storage means 122 (hereinafter also referred to as the "first latch circuit 121" and the "second latch circuit 122"), a NOT circuit is used for the means 123 for generating the inverted signal 105 of the signal 103 outputted from the first storage means 121 (hereinafter also referred to as the "NOT circuit 123"), and an AND circuit is used for the means 124 for comparing the signal 104 outputted from the second storage means 122 and the inverted signal 105 of the signal 103 outputted from the first storage means 121 (hereinafter also refereed to as the "AND circuit 124"). Note that the present invention is not limited to these circuits, and any circuit which can detect a change point of received data may be used.

The reference clock generation circuit 125 is a circuit which generates a clock signal in a receiving circuit 120. The reference clock counter circuit 126 includes means for counting clock signals generated from the reference clock generation circuit 125. In addition, the reference clock counter circuit 126 includes means for resetting a counter value obtained by counting a clock signal 107 outputted from the reference clock generation circuit 125 with a reset signal 106 outputted from the AND circuit 124. The frequency divider circuit 127 is a circuit for frequency-dividing a signal 108 generated from the reference clock counter circuit 126. The reference clock generation circuit 128 for receiving circuit operation is a circuit for generating a reference clock signal for operation of the receiving circuit 120.

In addition, FIG. 1 shows a transmitting circuit 110 including a reference clock generation circuit 111 and a data signal generating circuit 112. The transmitting circuit 110 functions as a circuit which generates a data signal 102 to be inputted to the receiving circuit 120 shown in FIG. 1. The reference clock generation circuit 111 is a circuit which generates a clock signal in the transmitting circuit 110, and the data signal generating circuit 112 is a circuit which generates the data signal 102 to be inputted to the receiving circuit 120. That is, each of the receiving circuit 120 and the transmitting circuit 110 includes a circuit which generates a clock signal (here, the reference clock generation circuit 125 in the receiving circuit 120, and the reference clock generation circuit 111 in the transmitting circuit 110). Accordingly, in general, the receiving circuit 120 and the transmitting circuit 110 generate different clock signals from each other, and synchronous operation is not performed.

In addition, a signal 101 outputted from the reference clock generation circuit 111 in the transmitting circuit 110 is a clock signal which operates the data signal generating circuit 112, and the data signal 102 outputted from the data signal generating circuit 112 is inputted to circuits (the first storage means 121, a logic circuit, or the like) in the receiving circuit 120. Note that transmission and reception of the data signal 102 between the transmitting circuit 110 and the receiving circuit 120 may be performed by wireless communication or wire communication.

In the receiving circuit 120, a signal 103 outputted from the first latch circuit 121 is inputted to the second latch circuit 122 and the NOT circuit 123. In addition, a signal 117 outputted from the reference clock generation circuit 125 in the receiving circuit 120 is inputted to the first latch circuit 121 and the second latch circuit 122 as clock signals for operating the first latch circuit 121 and the second latch circuit 122.

Note that, although shown here is an example in which the first latch circuit 121, the second latch circuit 122, the NOT circuit 123, and the AND circuit 124 are used for detection as means for detecting a change point of the received data signal 102, decision circuit means such as an OR circuit, a NAND circuit, a NOR circuit, an EXOR circuit, or an EX-NOR circuit may be used instead.

Here, the frequency divider circuit 127 is used in the receiving circuit 120. However, in the case where a value of the reference clock counter circuit 126 satisfies frequency of the reference clock generation circuit 128 for receiving circuit operation in the receiving circuit 120, a structure without the frequency divider circuit 127 can be used.

Figure 2:
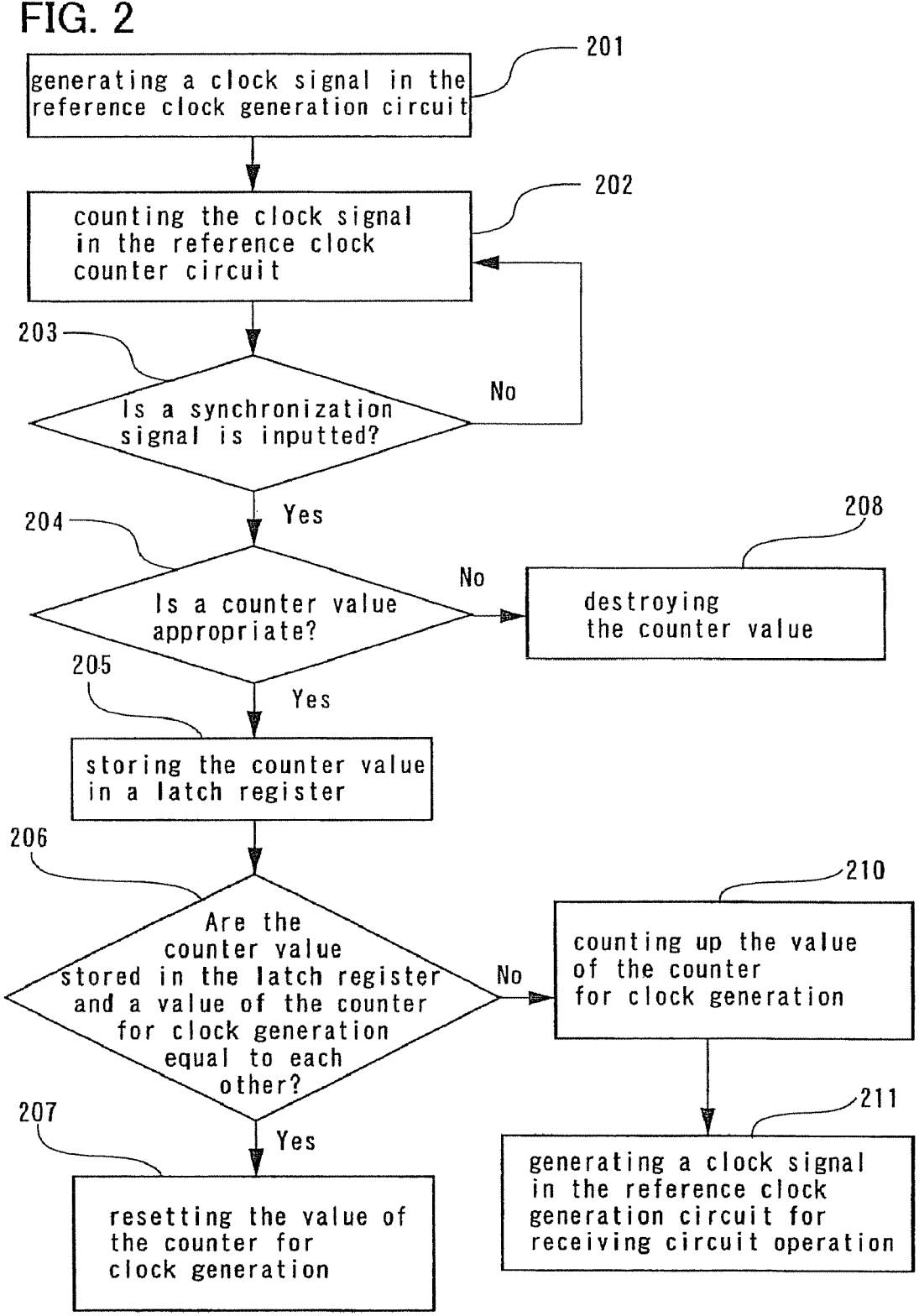
FIG. 2 is a diagram illustrating an example of a flow chart of a clock synchronization circuit of the present invention.

Next, an example of operation of a circuit in the clock synchronization circuit shown in this embodiment mode will be described using a flow chart of FIG. 2.

First, when a power supply is supplied, a clock signal is generated in the reference clock generation circuit 125 in the receiving circuit 120 (201). Here, a clock signal is generated using a ring oscillator as the reference clock generation circuit 125, and the clock signals are counted with the reference clock counter circuit 126 (202). Note that, as well as the ring oscillator, a crystal oscillator or means of an input signal from outside may be used as the reference clock generation circuit 125.

Next, whether or not a synchronization signal is inputted from an external circuit (here, the transmitting circuit 110) is judged by the first storage means 121, the second storage means 122, or the like (203). In the case where a synchronization signal is not inputted (No), counting of the clock signals of the ring oscillator is performed again (202). On the other hand, in the case where a synchronization signal is inputted (Yes), a counter value obtained by counting is judged whether or not the counter value is an appropriate value (204).

In the case where the counter value is not appropriate (No), the counter value is destroyed (208). When the counter value is appropriate (Yes), the counter value is stored in a latch register (205). Note that, here, the latch register can be provided in the reference clock counter circuit 126. Further, in the case where a synchronization signal is inputted, the counter value is reset with a reset signal.

Next, the counter value stored in the latch register in (205) is compared using a circuit which compares a counter value stored in a latch register and a value of a counter for clock generation (206). Note that the circuit which compares the counter value stored in the latch register and the value of the counter for clock generation can be provided in the reference clock counter circuit 126. Further, the counter for clock generation herein corresponds to a counter for deciding the number of frequency divisions of the frequency divider circuit 127.

In the case where the counter value stored in the latch register and the value of the counter for clock generation are different from each other (No), the value of the counter for clock generation is counted up (210), and a clock signal is generated by the reference clock generation circuit 128 for receiving circuit operation (211). On the other hand, in the case where the counter value stored in the latch register and the value of the counter for clock generation are equal to each other (Yes), the value of the counter for clock generation is reset by a circuit which resets a clock counter (207).

Next, a timing chart of the above-described circuit operation will be described with reference to FIG. 3.

Figure 3:
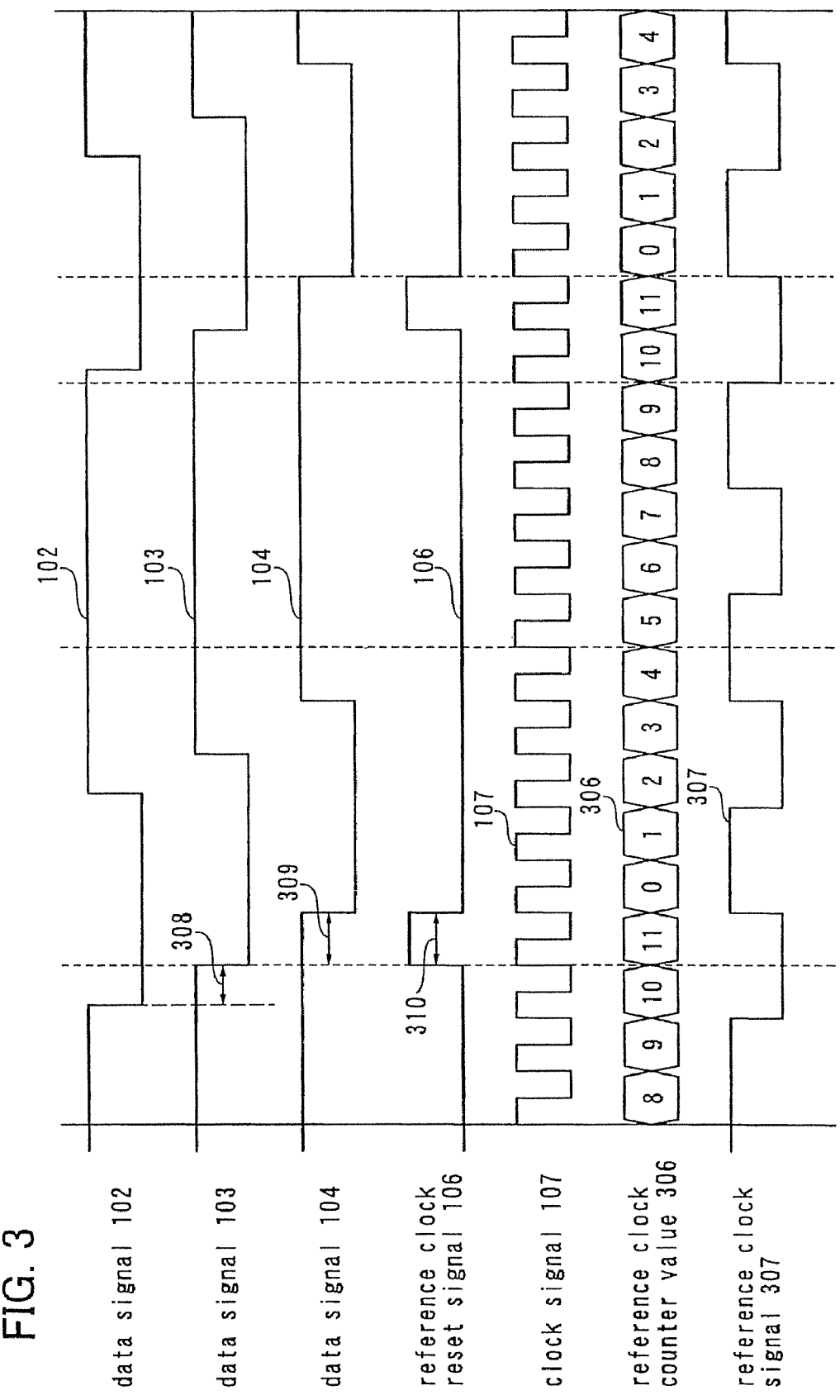
FIG. 3 is a diagram illustrating an example of a timing chart of a clock synchronization circuit of the present invention.

The timing chart shown in FIG. 3 shows operations of the data signal 102 inputted from the transmitting circuit 110 to the receiving circuit 120, the signal 103 outputted from the first latch circuit 121, the signal 104 outputted from the second latch circuit 122, the reference clock reset signal 106, the clock signal 107, a reference clock counter value 306 generated by the reference clock counter circuit 126, and a reference clock signal 307 for receiving circuit operation, generated by the reference clock generation circuit 128 for receiving circuit operation.

In addition, in FIG. 3, a time difference between the data signal 102 inputted from the transmitting circuit 110 to the receiving circuit 120 and the signal 103 outputted from the first latch circuit 121 in the receiving circuit 120 is referred to as a time difference 308, and a time difference between the signal 103 outputted from the first latch circuit 121 and the signal 104 outputted from the second latch circuit 122 is referred to as a time difference 309. Further, a period in which a reference clock is reset is referred to as a period 310.

Here, time deviation between the transmitting circuit 110 and the receiving circuit 120 is adjusted with the time difference 308 between the data signal 102 inputted from the transmitting circuit 110 to the receiving circuit 120 and the signal 103 outputted from the first latch circuit 121.

In addition, by comparing data stored in the first latch circuit 121 and the second latch circuit 122, the reference clock reset signal 106 is generated. That is, by comparing the signal 103 outputted from the first latch circuit 121 and the signal 104 outputted from the second latch circuit 122, the reference clock reset period 310 is generated. A value of the reference clock counter value 306 is reset in the reference clock reset period 310. In addition, the reference clock signal 307 for receiving circuit operation is generated from the value of the reference clock counter value 306.

As set forth above, by using the above-described clock synchronization circuit, the reference clock signal 307 for receiving circuit operation outputted from the reference clock generation circuit 128 for receiving circuit operation can be in synchronization with a data signal outputted from the transmitting circuit 110. Therefore, by operating a logic circuit or the like of a semiconductor device with the reference clock signal 307 for receiving circuit operation, stable communication is possible even in the case where different clock signals are used in a plurality of circuits.

Note that this embodiment mode can be freely combined with any of the other embodiment modes in this specification.

Embodiment Mode 2

This embodiment mode will describe an example of a clock synchronization circuit having a different structure from the above embodiment mode, with reference to the drawing.

Figure 4:
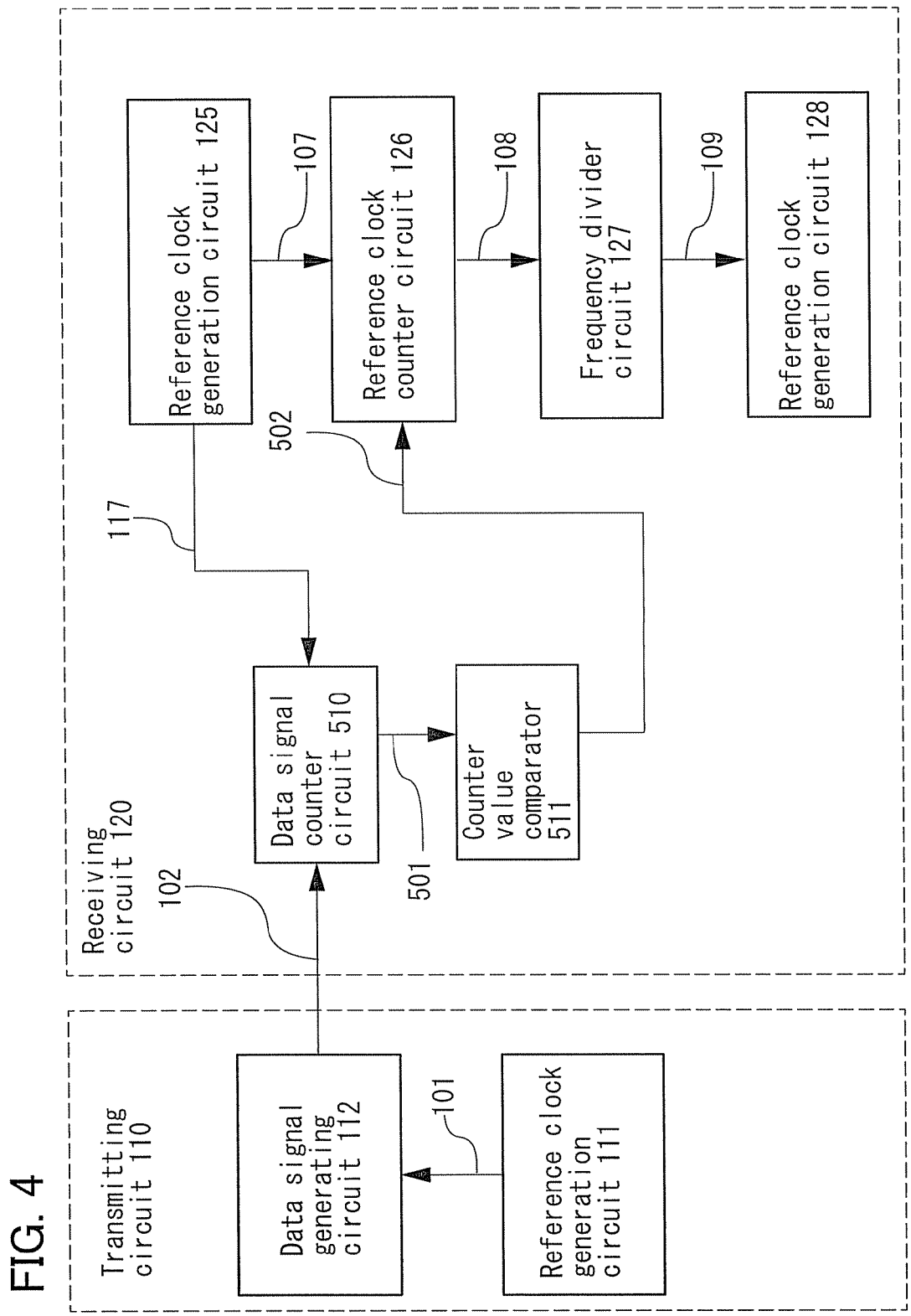
FIG. 4 is a diagram illustrating an example of a clock synchronization circuit of the present invention.
Figure 5:
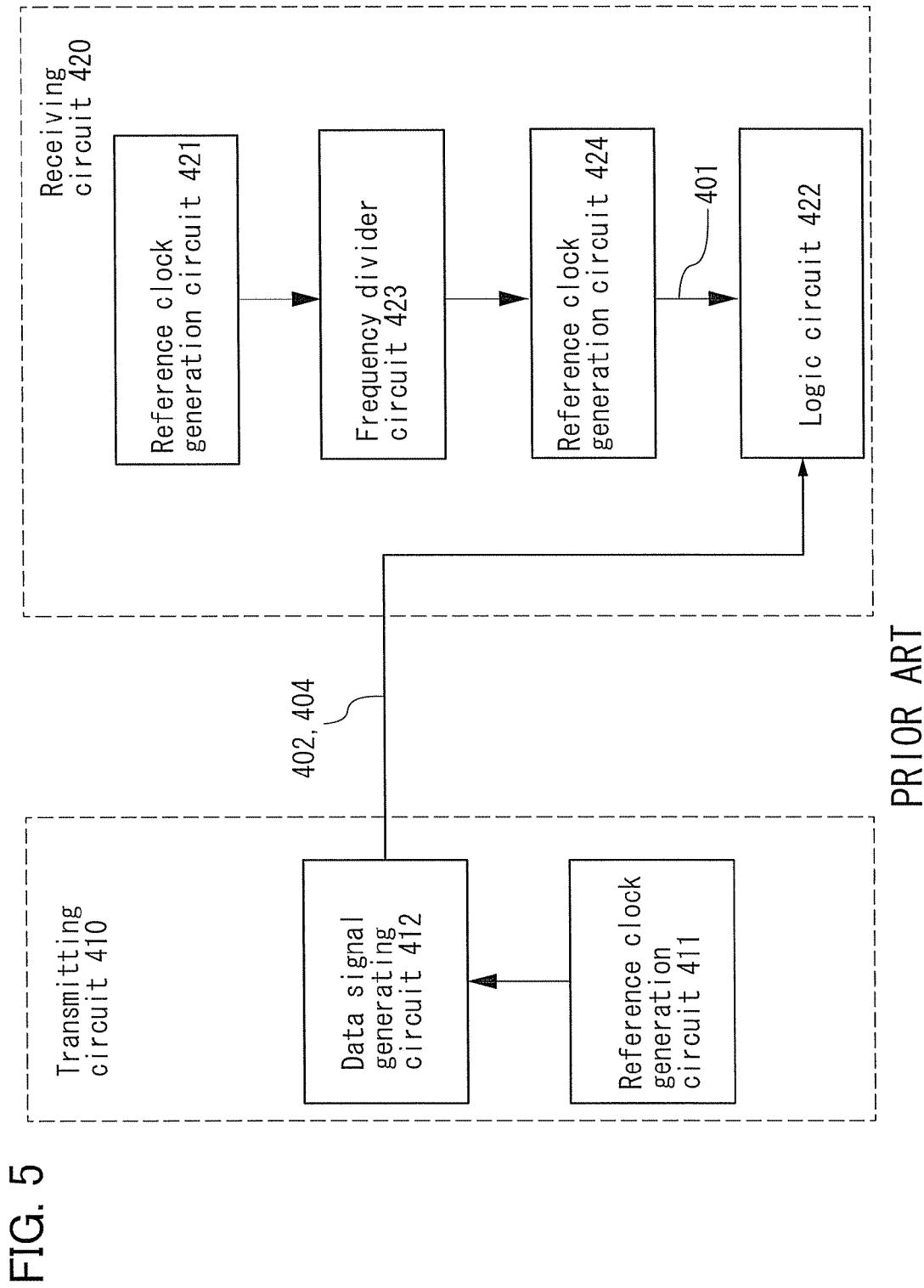
FIG. 5 is a diagram illustrating a conventional semiconductor device.
Figure 6:
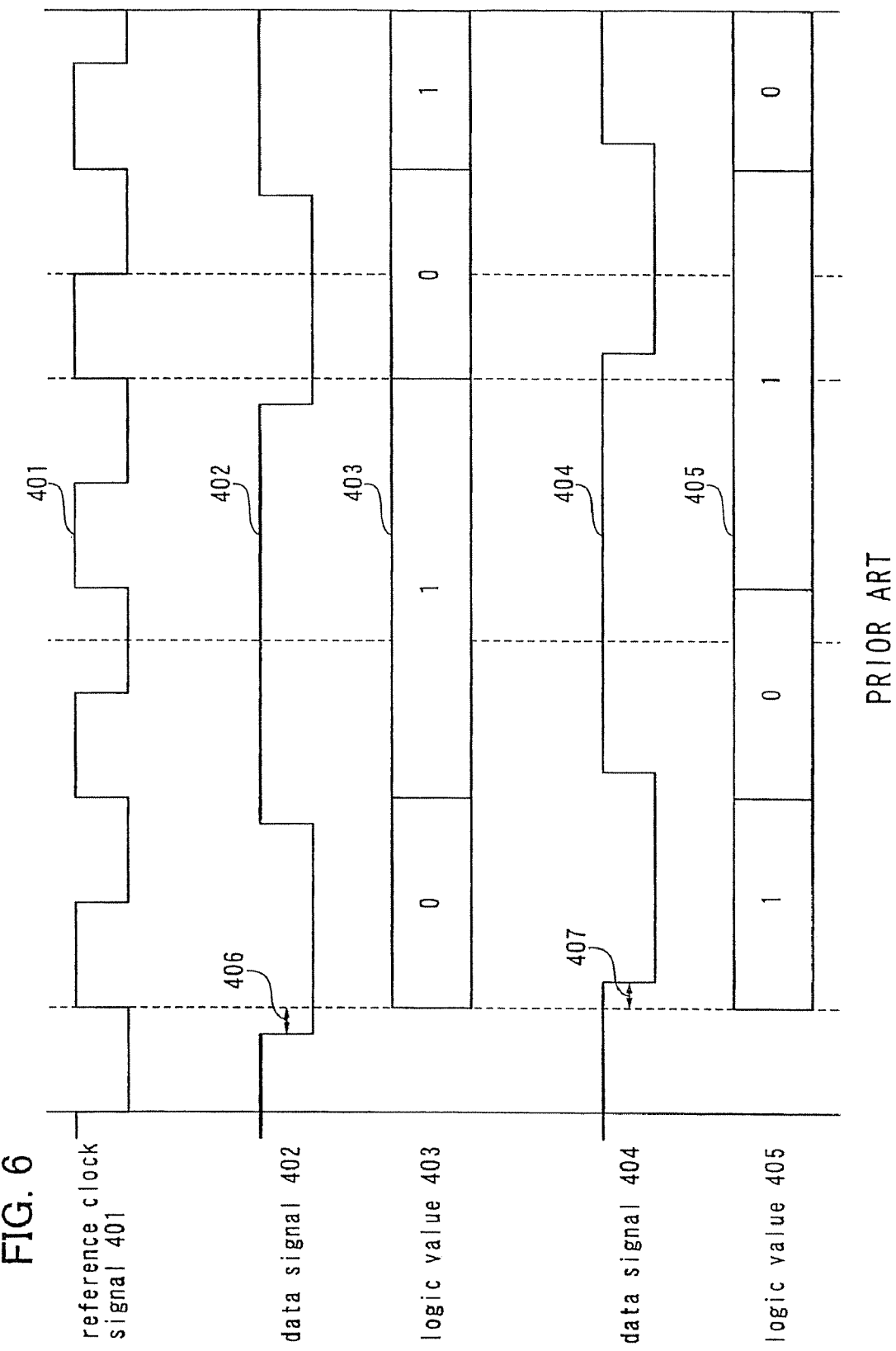
FIG. 6 is a timing chart of a conventional semiconductor device.

FIG. 4 shows an example of a block diagram of a synchronous circuit. The synchronous circuit shown in FIG. 4 includes a data signal counter circuit 510, a counter value comparator 511, the reference clock generation circuit 125, the reference clock counter circuit 126, the frequency divider circuit 127, and the reference clock generation circuit 128 for receiving circuit operation. That is, the first latch circuit 121, the second latch circuit 122, the NOT circuit 123, and the AND circuit 124 in the synchronous circuit shown in FIG. 1 are replaced with the data signal counter circuit 510 and the counter value comparator 511.

The data signal counter circuit 510 includes means for detecting a change point of a received data signal, and counts Low or High data signals. A signal 501 outputted from the data signal counter circuit 510 is inputted to the counter value comparator 511. In the counter value comparator 511, a signal of a counter value which is obtained by counting in the data signal counter circuit 510 and a comparison value set in advance are compared, and a reset signal 502 is outputted from the counter value comparator 511 in the case where the signal of the counter value and the comparison value correspond to each other.

In this manner, by detecting a change point of a data signal transmitted from the transmitting circuit 110 and using a reset signal generated based on the change point, counting of the reference clock counter circuit 126 is controlled, thereby even in the case of using different clock signals in the transmitting circuit 110 and the receiving circuit 120, synchronism can be provided in the receiving circuit.

Note that this embodiment mode can be freely combined with any of the other embodiment modes in this specification.

Embodiment Mode 3

This embodiment mode will describe a semiconductor device which has the clock synchronization circuit described in the above embodiment modes and can transmit and receive information wirelessly, with reference to drawings.

In recent years, a semiconductor device in which a micro IC chip and an antenna for wireless communication are combined, such as an RFID tag has been spotlighted. An RFID tag can write or read data by transmitting/receiving communication signals (operation magnetic field) using a wireless communication device (also referred to as a reader/writer).

A semiconductor device capable of transmitting and receiving information wirelessly such as an RFID tag is applied for, for example, product management in distribution industry. In recent years, product management using barcodes or the like is a mainstream; however, since data of barcodes are read optically, they cannot be read when a shield exists. Meanwhile, as to an RFID tag, since data is read wirelessly, it can be read even when a shield exists. Thus, higher efficiency, lower cost, and the like of product management can be achieved. In addition, wide use in tickets, airline passenger tickets, automatic checkout, and the like has been considered.

As the range of application of an RFID tag is expanding, the need for an RFID tag having a further advanced function is increasingly necessary. For example, data can be prevented from being leaked to a third party by encoding the data transmitted/received. There are methods of performing decoding/encoding processing using hardware, using software, and using both hardware and software. In the method of processing using hardware, an arithmetic circuit includes a circuit dedicated for decoding/encoding. In the method of processing using software, an arithmetic circuit includes a CPU (Central Processing Unit) and a large scale memory, the CPU executes a decoding/encoding program. In the method of processing using both hardware and software, an arithmetic circuit includes a dedicated circuit, a CPU, and a memory; the dedicated circuit performs a part of arithmetic processing of decoding/encoding, and the CPU executes programs the other arithmetic processing.

Figure 7:
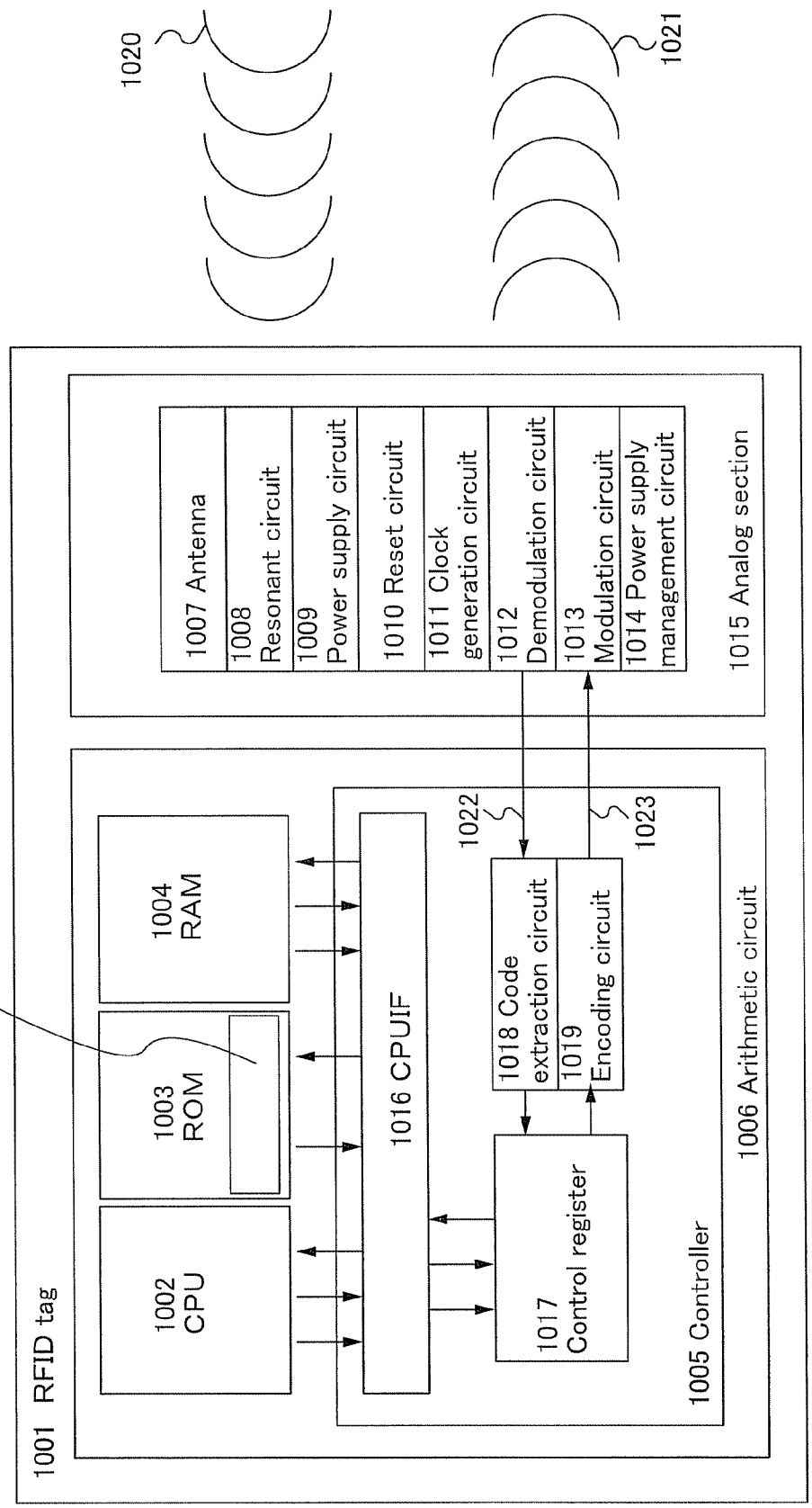
FIG. 7 is a diagram illustrating an example of a semiconductor device of the present invention.
Figure 8:
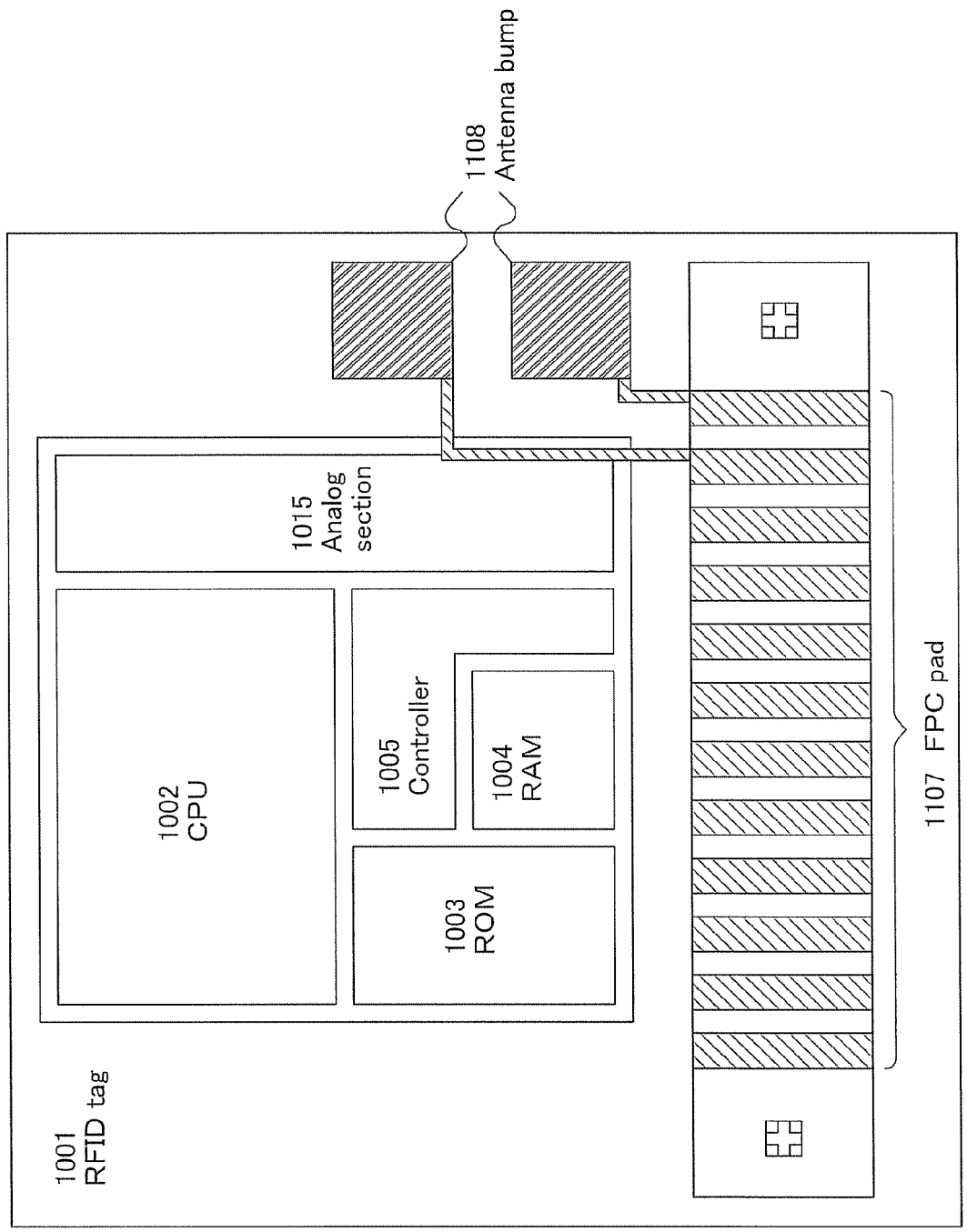
FIG. 8 is a diagram illustrating an example of a semiconductor device of the present invention.

This embodiment mode will describe an RFID tag having a cipher processing function as an example of a semiconductor device of the present invention, with reference to FIGS. 7 and 8. FIG. 7 is a block diagram of the RFID tag, and FIG. 8 shows a layout of the RFID tag.

First, a block structure of the semiconductor device shown in this embodiment mode will be described with reference to FIG. 7. In FIG. 7, the semiconductor device (hereinafter referred to as an "RFID tag 1001") such as an RFID tag includes an arithmetic circuit 1006 including a CPU 1002, a ROM 1003, a RAM 1004, and a controller 1005; and an analog section 1015 including an antenna 1007, a resonant circuit 1008, a power supply circuit 1009, a reset circuit 1010, a clock generation circuit 1011, a demodulation circuit 1012, a modulation circuit 1013, and a power supply management circuit 1014. The controller 1005 includes a CPU interface (CPUIF) 1016, a control register 1017, a code extraction circuit 1018, and an encoding circuit 1019. Note that, in FIG. 7, communication signals are shown separately as a reception signal 1020 and a transmission signal 1021 for simplification; however, actually they constitute an integrated signal, and are transmitted and received at the same time between the RFID tag 1001 and a reader/writer. After the reception signal 1020 is received by the antenna 1007 and the resonant circuit 1008, the reception signal 1020 is demodulated by the demodulation circuit 1012. The transmission signal 1021 is modulated by the modulation circuit 1013, and then transmitted from the antenna 1007. Note that the clock generation circuit 1011 can have the structure shown in the above embodiment modes.

In FIG. 7, when the RFID tag 1001 is set in a magnetic field formed by a communication signal, an induced electromotive force is generated by the antenna 1007 and the resonant circuit 1008. The induced electromotive force is held by an electric capacitor in the power supply circuit 1009, and the potential is stabilized by the electric capacitor and supplied to each circuit in the RFID tag 1001 as a power supply voltage. The reset circuit 1010 generates an initial reset signal of the whole RFID tag 1001. For example, a signal that rises after the increase in the power supply voltage is generated as a reset signal. The clock generation circuit 1011 changes a frequency and a duty ratio of a clock signal in accordance with a control signal generated by the power supply management circuit 1014. The demodulation circuit 1012 detects a change of the amplitude of the reception signal 1020 in an ASK method as reception data 1022 of "0"/"1". The demodulation circuit 1012 corresponds to, for example, a low pass filter. The modulation circuit 1013 transmits transmission data after changing the amplitude of the transmission signal 1021 in an ASK method. For example, when transmission data 1023 is "0", the point of resonance of the resonant circuit 1008 is changed to change the amplitude of the communication signal. The power supply management circuit 1014 monitors a power supply voltage supplied from the power supply circuit 1009 to the arithmetic circuit 1006 and the current consumption in the arithmetic circuit 1006, and generates a control signal for changing the frequency and the duty ratio of the clock signal in the clock generation circuit 1011.

An operation of the RFID tag of this embodiment mode will be described. First, the reception signal 1020 containing ciphertext data and transmitted from the reader/writer is received by the RFID tag 1001. The reception signal 1020 is demodulated by the demodulation circuit 1012, and then divided by the code extraction circuit 1018 into a control command, the ciphertext data, or the like, which is subsequently stored in the control register 1017. Here, the control command is data specifying a response of the RFID tag 1001. For example, transmission of a unique ID number, operation stop, cipher breaking, and the like are specified. Here, a control command of cipher breaking is to be received.

Next, in the arithmetic circuit 1006, the CPU 1002 breaks (decodes) the ciphertext by using a secret key 1024 stored in advance in the ROM 1003 in accordance with a code breaking program stored in the ROM 1003. The decoded ciphertext (decoded text) is stored in the control register 1017. At this time, the RAM 1004 is used as a data storing region. Note that the CPU 1002 accesses the ROM 1003, the RAM 1004, and the control register 1017 through the CPUIF 1016. The CPUIF 1016 has a function of generating an access signal for any of the ROM 1003, the RAM 1004, and the control register 1017 based on an address required by the CPU 1002.

As last, the encoding circuit 1019 generates the transmission data 1023 from the decoded text, which is then modulated in the modulation circuit 1013. Next, the transmission signal 1021 is transmitted from the antenna 1007 to the reader/writer.

Note that this embodiment mode has described, as an arithmetic method, a processing method using software, that is, a method in which the arithmetic circuit is formed by the CPU and the large capacity memory, and a program is executed by the CPU; however, it is also possible to select the optimum arithmetic method in accordance with the purpose and to form the arithmetic circuit based on the selected method. For example, as the arithmetic method, there are methods of performing the processing using hardware and using both hardware and software. In the method of processing using hardware, an arithmetic circuit may be a dedicated circuit. In the method of processing using both hardware and software, an arithmetic circuit includes a dedicated circuit, a CPU, and a memory; the dedicated circuit may perform a part of arithmetic processing, and the CPU may execute programs of the other part of arithmetic processing.

Next, a layout structure of the RFID tag will be described with reference to FIG. 8. Note that, in FIG. 8, the same parts as those in FIG. 7 are denoted by the same reference numerals and description of such parts is omitted.

In FIG. 8, FPC pads 1107 are electrode pad groups used for attaching the FPC (Flexible Print Circuit) to the RFID tag 1001, and antenna bumps 1108 are electrode pads used for attaching the antenna (not shown). Note that in the case of attaching the antenna, excess pressure may be applied to the antenna bump 1108. Therefore, it is desirable that components for forming a circuit such as a transistor not be placed under the antenna bump 1108.

The FPC pads 1107 are mainly effective when used for failure analysis. In the semiconductor device, since power supply voltage is obtained by a communication signal, for example, the arithmetic circuit is not operated completely when defects are generated in the antenna or the power supply circuit. Accordingly, failure analysis is significantly difficult. However, when a power supply voltage is supplied to the RFID tag 1001 from the FPC via the FPC pads 1107 and an arbitrary electrical signal is inputted instead of an electrical signal supplied from the antenna, the arithmetic circuit can be operated. Accordingly, failure analysis can be carried out efficiently.

In addition, it is more effective to provide the FPC pads 1107 such that measurement using a prober can be carried out. That is, in the FPC pads 1107, when the electrode pads are placed in accordance with a pitch of the prober needles, measurement using a prober is enabled. With the use of a prober, the number of steps for attaching the FPC can be eliminated at a time of failure analysis. Further, measurement can be performed even in the state where a plurality of RFID tags is formed over the substrate; thus, the number of steps for division into each RFID tag can be reduced as well. Further, quality inspection of RFID tags can be carried out immediately before the step of attaching an antenna in mass production. Thus, defectives can be screened out in an earlier stage in the process flow, so that production cost can be reduced.

Note that this embodiment mode can be freely combined with any of the other embodiment modes in this specification.

Embodiment Mode 4

This embodiment mode will describe a manufacturing method of an element for forming the semiconductor device such as the RFID tag shown in the above embodiment mode. A thin film transistor can be used as an element of each circuit for forming a semiconductor device of the present invention. This embodiment mode will describe a manufacturing method of a flexible semiconductor device in which a circuit for forming a part of the semiconductor device is formed using a thin film transistor, and the circuit is transferred from a substrate used for manufacturing the thin film transistor to a flexible substrate.

This embodiment mode will typically describe a p-channel TFT (also referred to as a "Pch-TFT") and an n-channel TFT (also referred to as an "Nch-TFT") which form an inverter or the like, and an antenna, as a circuit for forming a part of a semiconductor device. Hereinafter, a manufacturing method of the semiconductor device will be described using cross-sectional views shown in FIGS. 9A to 9D, 10A to 10C, and 11A and 11B.

Figure 9A:
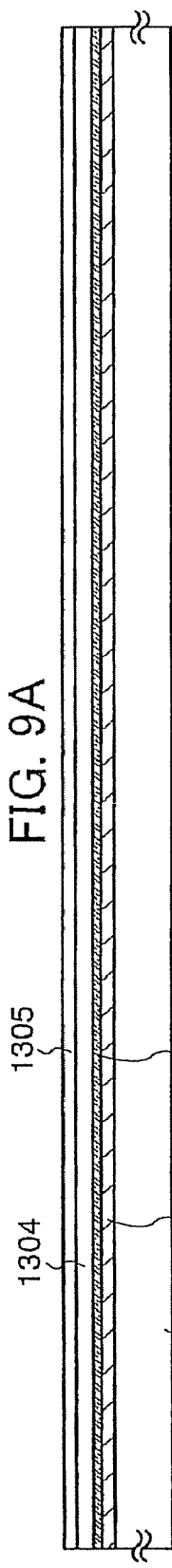
FIGS. 9A to 9D are diagrams illustrating an example of a manufacturing method of a semiconductor device of the present invention.
Figure 9B:
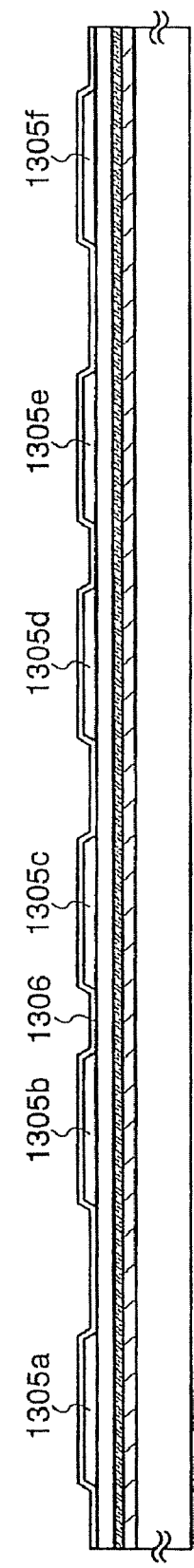
Figure 9C:
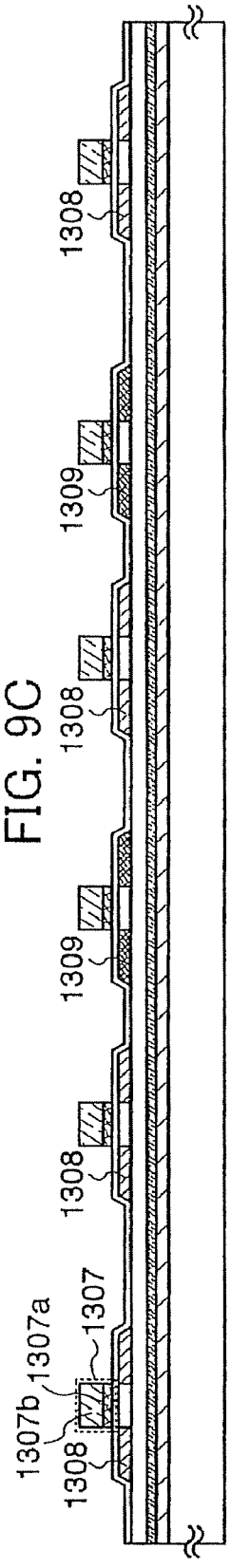

First, a release layer 1303 is formed over one surface of a substrate 1301 with an insulating film 1302 interposed therebetween, and sequentially, an insulating film 1304 which serves as a base film and a semiconductor film 1305 (e.g., a film containing amorphous silicon) are stacked (see FIG. 9A). Note that the insulating film 1302, the release layer 1303, the insulating film 1304, and the amorphous semiconductor film 1305 can be formed sequentially.

Note that as the substrate 1301, a glass substrate, a quartz substrate, a metal substrate (e.g., a stainless steel substrate), a ceramic substrate, or a semiconductor substrate such as a Si substrate, or the like can be used. In addition, as a plastic substrate, a substrate formed of polyethylene terephthalate (PET), polyethylene naphthalate (PEN), polyether sulfone (PES), acrylic, or the like can be used. Note that, in this process, the release layer 1303 is provided over the entire surface of the substrate 1301 with the insulating film 1302 interposed therebetween. However, the release layer may be provided over the entire surface of the substrate 1301, and then, the release layer may be selectively provided by a photolithography method, if necessary.

The insulating film 1302 and the insulating film 1304 are formed of an insulating material such as silicon oxide, silicon nitride, silicon oxynitride ($SiO_xN_y$) (x>y>0), or silicon nitride oxide ($SiN_xO_y$) (x>y>0), by a CVD method, a sputtering method, or the like. For example, in the case where the insulating film 1302 and the insulating film 1304 each have a two-layer structure, a silicon nitride oxide film may be formed as a first insulating film and a silicon oxynitride film may be formed as a second insulating film. Alternatively, a silicon nitride film may be formed as the first insulating film and a silicon oxide film may be formed as the second insulating film. The insulating film 1302 functions as a blocking layer which prevents an impurity element from being mixed from the substrate 1301 into the release layer 1303 or an element formed thereover. The insulating film 1304 functions as a blocking layer which prevents an impurity element from being mixed from the substrate 1301 and the release layer 1303 into an element formed over the insulating film 1304. By forming the insulating film 1302 and the insulating film 1304 each functioning as a blocking layer in this manner, it is possible to prevent alkaline earth metal or alkali metal such as Na in the substrate 1301, or an impurity element contained in the release layer 1303 from adversely affecting the element to be formed over the insulating film 1304. In the case of using quartz as the substrate 1301, the insulating film 1302 and the insulating film 1304 may be omitted.

As the release layer 1303, a metal film, a stacked-layer structure of a metal film and a metal oxide film, or the like can be used. The metal film is formed of a single layer or a stacked layer of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing the above-described element as its main component. The metal film and the metal oxide film can be formed by a sputtering method, various CVD methods such as a plasma CVD method, or the like, using these materials. As the stacked-layer structure of a metal film and a metal oxide film, after the above-described metal film is formed, an oxide or oxynitride of the metal film can be formed on the metal film surface by performing plasma treatment in an oxygen atmosphere or an $N_2O$ atmosphere, or heat treatment in an oxygen atmosphere or an $N_2O$ atmosphere. For example, in the case where a tungsten film is formed by a sputtering method, a CVD method, or the like as the metal film, a metal oxide film of a tungsten oxide can be formed on the tungsten film surface by performing plasma treatment on the tungsten film. In this case, an oxide of tungsten is expressed by WOx, and x is 2 to 3. There are cases of x=2 ($WO_2$), x=2.5 ($W_2O_5$), x=2.75 ($W_4O_{11}$), x=3 ($WO_3$), and the like. When an oxide of tungsten is formed, the value of x described above is not particularly restricted, and which oxide is to be formed may be decided based on an etching rate or the like. Alternatively, for example, a metal film (e.g., tungsten) may be formed, and then, an insulating film of silicon oxide ($SiO_2$) or the like may be formed over the metal film by a sputtering method, and a metal oxide (e.g., tungsten oxide over tungsten) may be formed over the metal film. In addition, as plasma treatment, high-density plasma treatment may be performed, for example. In addition, as well as the metal oxide film, a metal nitride or a metal oxynitride may also be used. In this case, the metal film may be subjected to the plasma treatment or the heat treatment in a nitrogen atmosphere or an atmosphere of nitrogen and oxygen.

The amorphous semiconductor film 1305 is formed having a thickness of 25 to 200 nm (preferably 30 to 150 nm) by a sputtering method, an LPCVD method, a plasma CVD method, or the like.

Next, the amorphous semiconductor film 1305 is crystallized by being irradiated with laser light. The amorphous semiconductor film 1305 may be crystallized by a method or the like in which a laser irradiation method is combined with a thermal crystallization method using an RTA or an annealing furnace or a thermal crystallization method using a metal element for promoting crystallization. After that, the obtained crystalline semiconductor film is etched so as to have a desired shape; thereby forming crystalline semiconductor films 1305a to 1305f. Then, a gate insulating film 1306 is formed so as to cover the semiconductor films 1305a to 1305f (see FIG. 9B).

The gate insulating film 1306 is formed of an insulating material such as silicon oxide, silicon nitride, silicon oxynitride ($SiO_xN_y$) (x>y>0), or silicon nitride oxide ($SiN_xO_y$) (x>y>0), by a CVD method, a sputtering method, or the like. For example, in the case where the gate insulating film 1306 has a two-layer structure, a silicon oxynitride film may be formed as a first insulating film and a silicon nitride oxide film may be formed as a second insulating film. Alternatively, a silicon oxide film may be formed as the first insulating film and a silicon nitride film may be formed as the second insulating film.

An example of a manufacturing step of the crystalline semiconductor films 1305*a* to 1305*f* will be briefly described below. First, an amorphous semiconductor film having a thickness of 50 to 60 nm is formed by a plasma CVD method. Next, a solution containing nickel that is a metal element for promoting crystallization is retained on the amorphous semiconductor film, and dehydrogenation treatment (at 500° C., for one hour) and thermal crystallization treatment (at 550° C., for four hours) are performed on the amorphous semiconductor film; thereby forming a crystalline semiconductor film. After that, the crystalline semiconductor film is irradiated with laser light, and a photolithography method is used, so that the crystalline semiconductor films 1305*a* to 1305*f* are formed. Note that without conducting the thermal crystallization using the metal element for promoting crystallization, the amorphous semiconductor film may be crystallized only by laser light irradiation.

As a laser oscillator which is used for crystallization, a continuous wave laser beam (a CW laser beam) or a pulsed wave laser beam (a pulsed laser beam) can be used. As a laser beam which can be used here, a laser beam emitted from one or more of the following can be used: a gas laser such as an Ar laser, a Kr laser or an excimer laser; a laser of which the medium is single crystalline YAG, $YVO_4$, forsterite ($Mg_2SiO_4$), $YAlO_3$, $GdVO_4$, or polycrystalline (ceramic) YAG, $Y_2O_3$, $YVO_4$, $YAlO_3$, $GdVO_4$, to which one or more of Nd, Yb, Cr, Ti, Ho, Er, Tm and Ta as a dopant is added; a glass laser; a ruby laser; an alexandrite laser; a Ti: sapphire laser; a copper vapor laser; or a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd: $YVO_4$ laser (fundamental wave of 1064 nm) can be used. An energy density of the laser at this time is necessary to be about 0.01 to 100 $MW/cm^2$ (preferably, 0.1 to 10 $MW/cm^2$). Irradiation is conducted with a scanning rate of about 10 to 2000 cm/sec. Note that a laser using, as a medium, single crystalline YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ to which one or more of Nd, Yb, Cr, Ti, Ho, Er, Tm, and Ta as a dopant is added; an Ar ion laser; or a Ti: sapphire laser can be continuously oscillated. Furthermore, pulse oscillation thereof can be performed with a repetition rate of 10 MHz or more by carrying out a Q-switch operation, mode locking or the like. In the case where a laser beam is oscillated with a repetition rate of 10 MHz or more, after a semiconductor film is melted by a laser and before it is solidified, the semiconductor film is irradiated with a next pulse. Therefore, unlike the case of using a pulsed laser with a low repetition rate, a solid-liquid interface can be continuously moved in the semiconductor film, so that crystal grains which continuously grow in a scanning direction can be obtained.

Alternatively, the gate insulating film 1306 may be formed by performing the above-described high-density plasma treatment on the semiconductor films 1305*a* to 1305*f* to oxidize or nitride the surfaces. For example, the film is formed by plasma treatment introducing a mixed gas of a rare gas such as He, Ar, Kr or Xe and oxygen, nitrogen oxide ($NO_2$), ammonia, nitrogen, hydrogen or the like. When excitation of the plasma in this case is performed by introduction of a microwave, high density plasma can be generated with a low electron temperature. By an oxygen radical (there is the case where an OH radical is included) or a nitrogen radical (there is the case where an NH radical is included) generated by this high-density plasma, the surface of the semiconductor film can be oxidized or nitrided.

By treatment using such high-density plasma, an insulating film having a thickness of 1 to 20 nm, typically 5 to 10 nm, is formed over a semiconductor film. Since the reaction of this case is a solid-phase reaction, interface state density between the insulating film and the semiconductor film can be extremely low. Since such high-density plasma treatment oxidizes (or nitrides) a semiconductor film (crystalline silicon, or polycrystalline silicon) directly, variation of a thickness of the insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, an insulating film with good uniformity and low interface state density can be formed without causing oxidation reaction abnormally in a crystal grain boundary.

As the gate insulating film, an insulating film formed by the high-density plasma treatment may be used by itself, or an insulating film of silicon oxide, silicon oxynitride, silicon nitride or the like may be formed thereover by a CVD method using plasma or thermal reaction, so as to make stacked layers. In any case, a transistor including an insulating film formed by high-density plasma, in a part of the gate insulating film or in the whole gate insulating film, can reduce variation of the characteristic.

Furthermore, the semiconductor films 1305*a* to 1305*f* obtained by irradiating a semiconductor film with a continuous wave laser beam or a laser beam oscillated with a repetition rate of 10 MHz or more and scanning the semiconductor film in one direction for crystallization, have a characteristic that the crystal grows in the scanning direction of the beam. When a transistor is placed so that the scanning direction is aligned with the channel length direction (the direction in which a carrier flows when a channel formation region is formed) and the above-described gate insulating film is used, a thin film transistor (TFT) with fewer characteristic variation and high electron field-effect mobility can be obtained.

Next, a first conductive film and a second conductive film are stacked over the gate insulating film 1306. Here, the first conductive film is formed having a thickness of 20 to 100 nm by a CVD method, a sputtering method or the like. The second conductive film is formed having a thickness of 100 to 400 nm. The first conductive film and the second conductive film are formed of an element selected from tantalum (Ta), tungsten (W), titanium (Ti), molybdenum (Mo), aluminum (Al), copper (Cu), chromium (Cr), niobium (Nb) and the like, or an alloy material or a compound material containing the above-described element as its main component. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in the case of a three-layer structure instead of a two-layer structure, a stacked-layer structure of a molybdenum film, an aluminum film, and a molybdenum film may be adopted.

Next, a resist mask is formed by using a photolithography method, and etching treatment for forming a gate electrode and a gate line is performed, so that gate electrodes 1307 are formed over the semiconductor films 1305a to 1305f. Shown here is an example in which one of the gate electrodes 1307 has a stacked-layer structure of a first conductive film 1307a and a second conductive film 1307b.

Next, the gate electrodes 1307 are used as masks, and an impurity element imparting n-type conductivity is added at a low concentration to the semiconductor films 1305a to 1305f, by an ion doping method or an ion implantation method. Then, a resist mask is selectively formed by a photolithography method, and an impurity element imparting p-type conductivity is added at a high concentration to the semiconductor films 1305a to 1305f. As the n-type impurity element, phosphorus (P), arsenic (As), or the like can be used. As the p-type impurity element, boron (B), aluminum (Al), gallium (Ga), or the like can be used. Here, phosphorus (P) is used as an impurity element imparting n-type conductivity and selectively introduced into the semiconductor films 1305a to 1305f so that they contain phosphorus (P) at a concentration of $1\times10^{15}$ to $1\times10^{19}/cm^3$, and thus, n-type impurity regions 1308 are formed. In addition, boron (B) is used as an impurity element imparting p-type conductivity and selectively introduced into the semiconductor films 1305c and 1305e so that they contain boron (B) at a concentration of $1\times10^{19}$ to $1\times10^{20}/cm^3$, and thus, p-type impurity regions 1309 are formed (see FIG. 9C).

Next, an insulating film is formed so as to cover the gate insulating film 1306 and the gate electrodes 1307. The insulating film is formed of a single layer or a stacked layer of a film containing an inorganic material such as silicon, an oxide of silicon, or a nitride of silicon, or an organic material such as an organic resin, by a plasma CVD method, a sputtering method, or the like. Next, the insulating film is selectively etched by anisotropic etching mainly in a perpendicular direction, so that insulating films 1310 (also referred to as side walls) which are in contact with side surfaces of the gate electrodes 1307 are formed. The insulating films 1310 are used as doping masks when LDD (Lightly Doped Drain) regions are formed.

Next, using a resist mask formed by a photolithography method, the gate electrodes 1307 and the insulating films 1310 as masks, an impurity element imparting n-type conductivity is added at a high concentration to the semiconductor films 1305a, 1305b, 1305d, and 1305f, so that n-type impurity regions 1311 are formed. Here, phosphorus (P) is used as an impurity element imparting n-type conductivity and selectively introduced into the semiconductor films 1305a, 1305b, 1305d, and 1305f so that they contain phosphorus (P) at a concentration of $1\times10^{19}$ to $1\times10^{20}/cm^3$, and thus, the n-type impurity regions 1311, which has higher concentration than the impurity regions 1308, are formed.

Figure 9D:
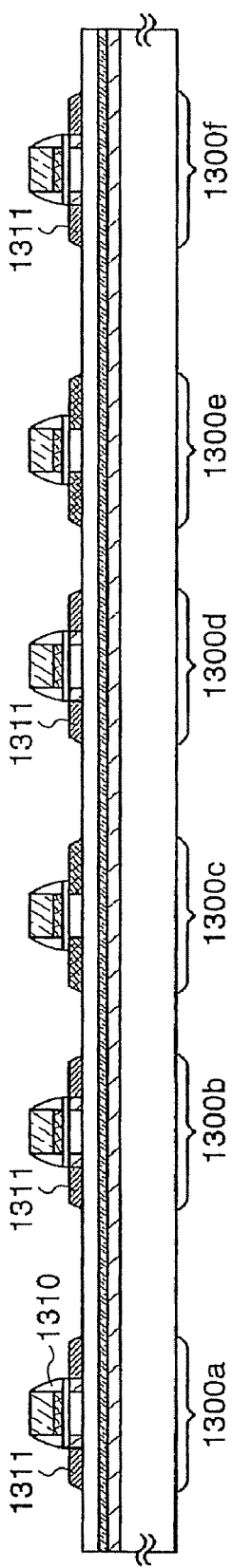

By the above-described steps, n-channel thin film transistors 1300a, 1300b, 1300d, and 1300f, and p-channel thin film transistors 1300c and 1300e are formed (see FIG. 9D).

In the n-channel thin film transistor 1300a, a channel formation region is formed in a region of the semiconductor film 1305a, which overlaps with one of the gate electrodes 1307; the impurity regions 1311 which form a source region and a drain region are formed in regions which do not overlap with the gate electrodes 1307 and the insulating films 1310; and low-concentration impurity regions (LDD regions) are formed in regions which overlap with the insulating films 1310 and between the channel formation region and the impurity regions 1311. In addition, each of the n-channel thin film transistors 1300b, 1300d, and 1300f is similarly provided with a channel formation region, low-concentration impurity regions, and the impurity regions 1311.

In the p-channel thin film transistor 1300c, a channel formation region is formed in a region of the semiconductor film 1305c, which overlaps with one of the gate electrodes 1307, and the impurity regions 1309 which form a source region and a drain region are formed in regions which do not overlap with one of the gate electrodes 1307. In addition, the p-channel thin film transistor 1300e is similarly provided with a channel formation region and the impurity regions 1309. Note that the p-channel thin film transistors 1300c and 1300e are not provided with an LDD region here; however, the p-channel thin film transistor may be provided with an LDD region and the n-channel thin film transistor is not necessarily provided with an LDD region.

Next, an insulating film is formed of a single layer or a stacked layer so as to cover the semiconductor films 1305a to 1305f, the gate electrodes 1307, and the like; and then, conductive films 1313 which are electrically connected to the impurity regions 1309 and 1311 which form the source regions and the drain regions of the thin film transistors 1300a to 1300f are formed, over the insulating film (see FIG. 10A). The insulating film is formed of a single layer or a stacked layer using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharge method, a screen printing method, or the like. Here, the insulating film has a two-layer structure, a silicon nitride oxide film is formed as a first insulating film 1312a, and a silicon oxynitride film is formed as a second insulating film 1312b. In addition, the conductive films 1313 can form source electrodes or drain electrodes of the thin film transistors 1300a to 1300f.

Note that before the insulating films 1312a and 1312b are formed or after one or more of thin films of the insulating films 1312a and 1312b are formed, heat treatment for recovering the crystallinity of the semiconductor film, for activating the impurity element which has been added into the semiconductor film, or for hydrogenating the semiconductor film may be performed. For the heat treatment, thermal annealing, a laser annealing method, an RTA method, or the like may be adopted.

The conductive films 1313 are formed of a single layer or a stacked layer using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component by a CVD method, a sputtering method, or the like. An alloy material containing aluminum as its main component corresponds to a material which contains aluminum as its main component and which also contains nickel, or an alloy material which contains aluminum as its main component and which also contains nickel and one or both of carbon and silicon, for example. The conductive films 1313 preferably employ, for example, a stacked-layer structure of a barrier film, an aluminum-silicon (Al—Si) film and a barrier film, or a stacked-layer structure of a barrier film, an aluminum-silicon (Al—Si) film, a titanium nitride film and a barrier film. Note that a barrier film corresponds to a thin film formed by using titanium, a nitride of titanium, molybdenum, or a nitride of molybdenum. Aluminum and aluminum silicon which have low resistance and are inexpensive are optimal materials for forming the conductive films 1313. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film is reduced, so that preferable contact with the crystalline semiconductor film can be obtained.

Next, an insulating film 1314 is formed so as to cover the conductive films 1313, and then conductive films 1315*a* and 1315*b* to be electrically connected to the conductive films 1313 which form the source electrodes or drain electrodes of the thin film transistors 1300*a* and 1300*f* are formed over the insulating film 1314. A conductive film 1316 to be electrically connected to the conductive film 1313 which forms the source electrode or drain electrode of the thin film transistor 1300*b* is formed. Note that the conductive film 1316 may be formed of the same material at the same time as those of the conductive films 1315*a* and 1315*b*. The conductive films 1315*a* and 1315*b*, and the conductive film 1316 can be formed using any material given for the conductive films 1313.

Next, a conductive film 1317 which functions as an antenna is formed so as to be electrically connected to the conductive film 1316 (see FIG. 10B).

The insulating film 1314 can be formed of a single-layer structure or a stacked-layer structure of an insulating film containing oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as DLC (Diamond-Like Carbon); an organic material such as epoxy, polyimide, polyamide, polyvinyl phenol, benzocyclobutene, or acrylic; and/or a siloxane material such as a siloxane resin, by a CVD method, a sputtering method, or the like. Note that the siloxane material corresponds to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) is used. As a substituent, a fluoro group can also be used. Alternatively, an organic group containing at least hydrogen and a fluoro group may be used as a substituent.

The conductive film 1317 is formed of a conductive material by using a CVD method, a sputtering method, a printing method such as a screen printing method or a gravure printing method, a droplet discharge method, a dispensing method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing the above-described element as its main component. The conductive films are formed to have a single-layer structure or a stacked-layer structure.

For example, in the case of forming the conductive film 1317 which functions as the antenna by using a screen printing method, the conductive film 1317 can be provided by selectively printing a conductive paste in which conductive particles having a grain size of several nm to several tens of μm are dissolved or dispersed in an organic resin. As the conductive particles, metal particles of one or more kinds from any of silver (Ag), gold (Au), copper (Cu), nickel (Ni), platinum (Pt), palladium (Pd), tantalum (Ta), molybdenum (Mo), titanium (Ti), and the like, fine particles of silver halide, or dispersing nanoparticles can be used. In addition, as the organic resin included in the conductive paste, one or more of organic resins which are selected from organic resins which function as a binder, a solvent, a dispersing agent, and a coating member for the metal particles can be used. Typically, an organic resin such as an epoxy resin or a silicone resin can be used. Further, when the conductive film is formed, baking may be preferably performed after the conductive paste is applied. For example, in the case of using fine particles containing silver as its main component (e.g., the grain size is in the range of 1 nm to 100 nm, inclusive) as a material for the conductive paste, the conductive film can be obtained by curing by baking at a temperature of 150 to 300° C. Alternatively, fine particles containing solder or lead-free solder as its main component may be used as well; in that case, fine particles having a grain size of 20 μm or less are preferably used. Solder or lead-free solder has advantages such as a low cost.

In addition, each of the conductive films 1315*a* and 1315*b* can function as wiring which is electrically connected to a battery included in a semiconductor device of the present invention in a later process. Further, when the conductive film 1317 which functions as the antenna is formed, a conductive film may be separately formed so as to be electrically connected to the conductive films 1315*a* and 1315*b*, and the conductive film may be used as the wiring connected to the battery.

Next, after an insulating film 1318 is formed so as to cover the conductive film 1317, a layer (hereinafter referred to as an "element formation layer 1319") including the thin film transistors 1300*a* to 1300*f*, the conductive film 1317, and the like is peeled off from the substrate 1301. Here, openings are formed in regions where the thin film transistors 1300*a* to 1300*f* are not formed by laser light irradiation (e.g., UV light) (see FIG. 10C), and then, the element formation layer 1319 can be peeled off from the substrate 1301 by using physical force. Alternatively, before the element formation layer 1319 is peeled off from the substrate 1301, an etchant may be introduced into the formed openings to selectively remove the release layer 1303. As the etchant, gas or liquid containing halogen fluoride or an interhalogen compound is used. For example, chlorine trifluoride ($ClF_3$) is used as gas containing halogen fluoride. Accordingly, the element formation layer 1319 is peeled off from the substrate 1301. Note that the release layer 1303 may be partially left instead of being removed entirely. By leaving a part of the release layer 1303, consumption of the etchant can be reduced and time for removing the release layer can be shortened. In addition, the element formation layer 1319 can be retained over the substrate 1301 even after the release layer 1303 is removed. Further, the substrate 1301 is reused after the element formation layer 1319 is peeled off; therefore, cost can be reduced.

The insulating film 1318 can be formed of a single-layer structure or a stacked-layer structure of an insulating film containing oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as DLC (Diamond-Like Carbon); an organic material such as epoxy, polyimide, polyamide, polyvinyl phenol, benzocyclobutene, or acrylic; and/or a siloxane material such as a siloxane resin, by a CVD method, a sputtering method, or the like.

In this embodiment mode, after the openings are formed in the element formation layer 1319 by laser light irradiation, a first sheet material 1320 is attached to one surface of the element formation layer 1319 (a surface where the insulating film 1318 is exposed), and then, the element formation layer 1319 is peeled off from the substrate 1301 (see FIG. 11A).

Next, after a second sheet material 1321 is provided to the other surface (a surface exposed by peeling) of the element formation layer 1319, the second sheet material 1321 is attached thereto by one or both of heat treatment and pressure treatment (see FIG. 11B). As the first sheet material 1320 and the second sheet material 1321, a hot-melt film or the like can be used.

As the first sheet material 1320 and the second sheet material 1321, a film on which an antistatic treatment for preventing static electricity or the like is performed (hereinafter referred to as an antistatic film) can be used. As the antistatic film, a film with an antistatic material dispersed in a resin, a film with an antistatic material attached thereon, and the like can be given as examples. The film provided with an antistatic material may be a film with an antistatic material provided over one of its surfaces, or a film with an antistatic material provided over each of its surfaces. As for the film with an antistatic material provided over one of its surfaces, the film may be attached to the layer so that the antistatic material is placed on the inner side of the film or the outer side of the film. The antistatic material may be provided over the entire surface of the film, or over a part of the film. As the antistatic material here, a metal, indium tin oxide (ITO), a surfactant such as an amphoteric surfactant, a cationic surfactant, or a nonionic surfactant can be used. In addition to that, as the antistatic material, a resin material containing cross-linked copolymer having a carboxyl group and a quaternary ammonium base on its side chain, or the like can be used. By attaching, mixing, or applying such a material to a film, an antistatic film can be formed. By performing the sealing using the antistatic film, adverse effects on a semiconductor element, when dealt with as a commercial product, due to external static electricity can be reduced.

Note that this embodiment mode can be freely combined with any of the other embodiment modes in this specification.

Embodiment Mode 5

This embodiment mode will describe a manufacturing method of a semiconductor device which is different from the above embodiment mode. A transistor in the present invention can be formed of a MOS transistor using a single crystalline substrate as well as the thin film transistor over the insulating substrate which is described in the above embodiment mode.

This embodiment mode will typically describe a p-channel TFT (also referred to as a "Pch-TFT") and an n-channel TFT (also referred to as an "Nch-TFT") which form an inverter or the like, as a circuit for forming a part of a semiconductor device. Hereinafter, a manufacturing method of a semiconductor device will be described using cross-sectional views shown in FIGS. 12A to 12C, 13A to 13C, and 14.

Figure 12A:
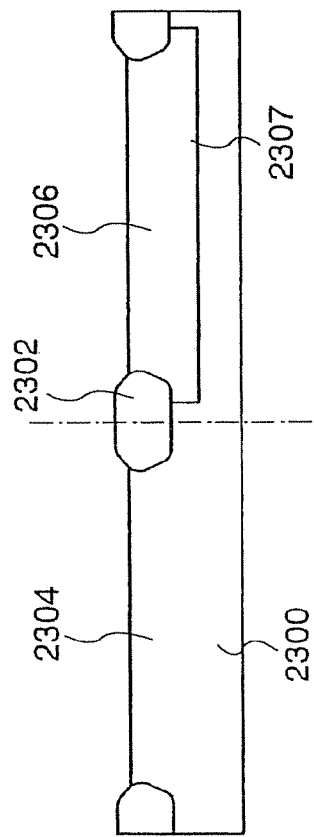
FIGS. 12A to 12C are diagrams illustrating an example of a manufacturing method of a semiconductor device of the present invention.

First, separated element regions 2304 and 2306 (hereinafter also referred to as the regions 2304 and 2306) are formed in a semiconductor substrate 2300 (see FIG. 12A). The regions 2304 and 2306 provided in the semiconductor substrate 2300 are separated from each other by an insulating film 2302 (also referred to as a field oxide film). In the example described here, a single crystalline Si substrate having n-type conductivity is used as the semiconductor substrate 2300, and a p-well 2307 is provided in the region 2306 in the semiconductor substrate 2300.

In addition, any semiconductor substrate can be used as the semiconductor substrate 2300. For example, a single crystalline Si substrate having n-type or p-type conductivity, a compound semiconductor substrate (e.g., GaAs substrate, InP substrate, GaN substrate, SiC substrate, sapphire substrate, or ZnSe substrate), an SOI (Silicon On Insulator) substrate manufactured by a bonding method or a SIMOX (Separation by IMplanted OXygen) method, or the like can be used.

For forming the separated element regions 2304 and 2306, a selective oxidation method (LOCOS (LOCal Oxidation of Silicon) method), a trench isolation method, or the like can be used as appropriate.

Furthermore, the p-well in the region 2306 in the semiconductor substrate 2300 can be formed by selectively introducing an impurity element having p-type conductivity into the semiconductor substrate 2300. As the p-type impurity element, boron (B), aluminum (Al), gallium (Ga), or the like can be used.

Note that although an impurity element is not introduced into the region 2304 since the semiconductor substrate having n-type conductivity is used as the semiconductor substrate 2300 in this embodiment mode, an n-well may be formed in the region 2304 by introducing an n-type impurity element. As the n-type impurity element, phosphorus (P), arsenic (As), or the like can be used. On the other hand, in the case where a semiconductor substrate having p-type conductivity is used, an n-well may be formed in the region 2304 by introducing an n-type impurity element and no impurity element may be introduced into the region 2306.

Figure 12B:
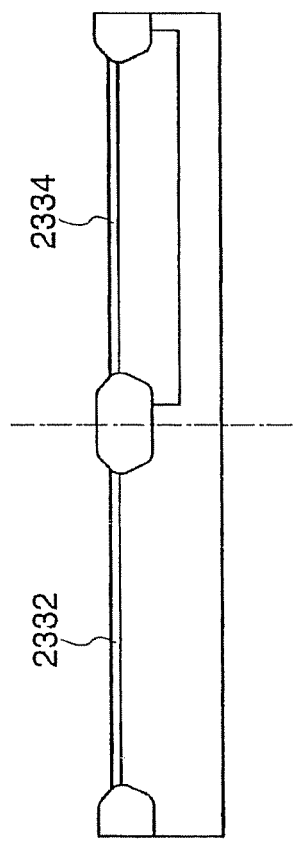

Next, insulating films 2332 and 2334 are formed so as to cover the regions 2304 and 2306 respectively (see FIG. 12B).

The insulating films 2332 and 2334 can be formed of, for example, silicon oxide films by oxidizing respective surfaces of the regions 2304 and 2306 in the semiconductor substrate 2300 with heat treatment. Alternatively, the insulating films 2332 and 2334 may be formed of a stacked-layer structure of a silicon oxide film and a film containing oxygen and nitrogen (silicon oxynitride film) by forming the silicon oxide film with a thermal oxidation method and then nitriding the surface of the silicon oxide film with nitridation treatment.

Further alternatively, the insulating films 2332 and 2334 may be formed using plasma treatment as described above. For example, by performing oxidation treatment or nitridation treatment with high-density plasma treatment on the surfaces of the regions 2304 and 2306 in the semiconductor substrate 2300, silicon oxide ($SiO_x$) films or silicon nitride ($SiN_x$) films can be formed as the insulating films 2332 and 2334. Further, after oxidation treatment is performed on the surfaces of the regions 2304 and 2306 with high-density plasma treatment, nitridation treatment may be performed by performing high-density plasma treatment again. In this case, silicon oxide films are formed on the surfaces of the regions 2304 and 2306, and silicon oxynitride films are formed on the silicon oxide films, so that each of the insulating films 2332 and 2334 is a film in which the silicon oxide film and the silicon oxynitride film are stacked. Further alternatively, after silicon oxide films are formed on the surfaces of the regions 2304 and 2306 by a thermal oxidation method, oxidation treatment or nitridation treatment may be performed by high-density plasma treatment.

In addition, each of the insulating films 2332 and 2334 formed in the regions 2304 and 2306 in the semiconductor substrate 2300 functions as a gate insulating film in a transistor to be completed later.

Figure 12C:
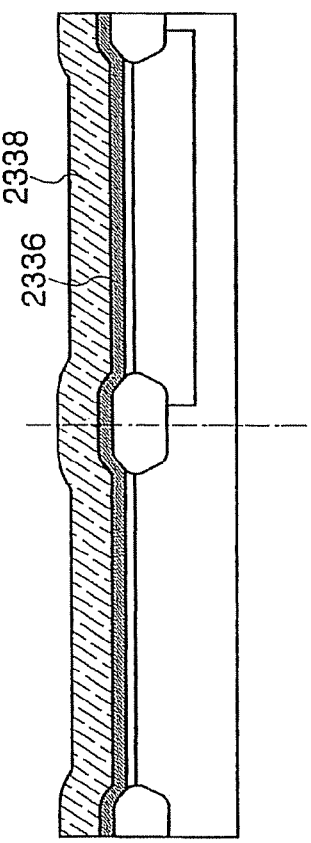

Next, a conductive film is formed so as to cover the insulating films 2332 and 2334 formed above the regions 2304 and 2306 (see FIG. 12C). Shown here is an example in which the conductive film is formed by stacking a conductive film 2336 and a conductive film 2338 sequentially. Naturally, the conductive film may be formed of a single layer or a stacked-layer structure including three or more layers.

The conductive films 2336 and 2338 can be formed of an element selected from tantalum (Ta), tungsten (W), titanium (Ti), molybdenum (Mo), aluminum (Al), copper (Cu), chromium (Cr), niobium (Nb) and the like, or an alloy material or a compound material containing the above-described element as its main component. Alternatively, a metal nitride film obtained by nitriding the above-described element can be used. Further alternatively, a semiconductor material typified by polycrystalline silicon doped with an impurity element such as phosphorus can also be used.

Here, a stacked-layer structure is provided such that the conductive film 2336 is formed using tantalum nitride and the conductive film 2338 is stacked thereon using tungsten. Alternatively, the conductive film 2336 can be formed of either a single-layer or stacked-layer film using tungsten nitride, molybdenum nitride, and/or titanium nitride, and the conductive film 2338 can also be formed of either a single-layer or stacked-layer film using tantalum, molybdenum, and/or titanium.

Next, the conductive films 2336 and 2338 which are stacked are selectively etched to be removed so that the conductive films 2336 and 2338 remain above a part of the regions 2304 and 2306. Thus, gate electrodes 2340 and 2342 are formed (see FIG. 13A).

Next, a resist mask 2348 is selectively formed so as to cover the region 2304. Then, the region 2306 is doped with an impurity element, using the resist mask 2348 and the gate electrode 2342 as masks, thereby forming impurity regions (see FIG. 13B). As the impurity element, an impurity element imparting n-type conductivity or an impurity element imparting p-type conductivity is used. As the n-type impurity element, phosphorus (P), arsenic (As), or the like can be used. As the p-type impurity element, boron (B), aluminum (Al), gallium (Ga), or the like can be used. Here, as the impurity element, phosphorus (P) is used.

Figure 13A:
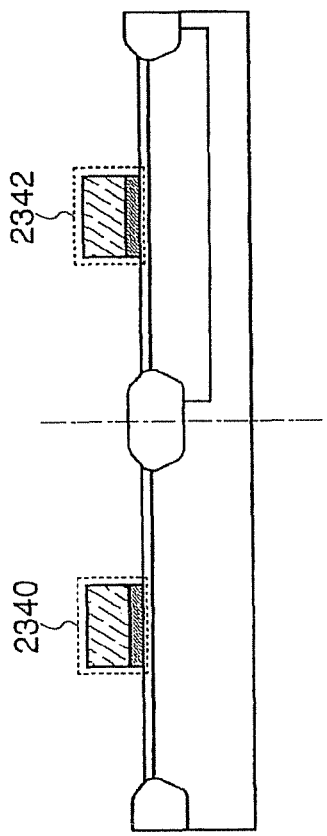
FIGS. 13A to 13C are diagrams illustrating an example of a manufacturing method of a semiconductor device of the present invention.
Figure 13B:
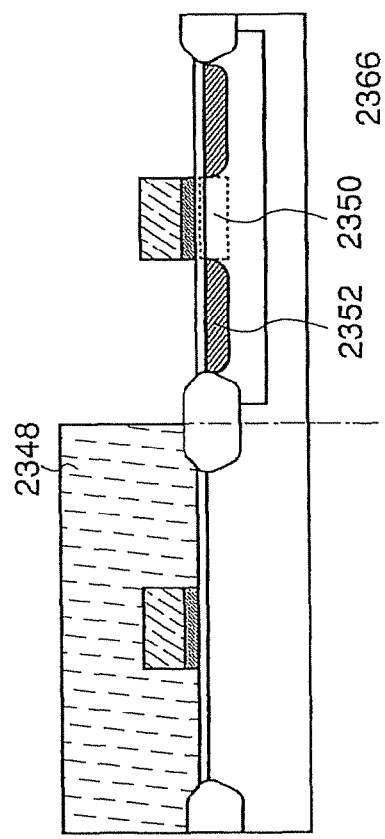
Figure 13C:
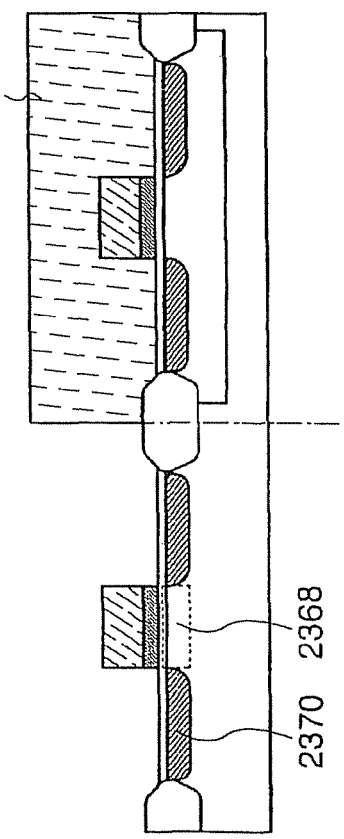
Figure 14:
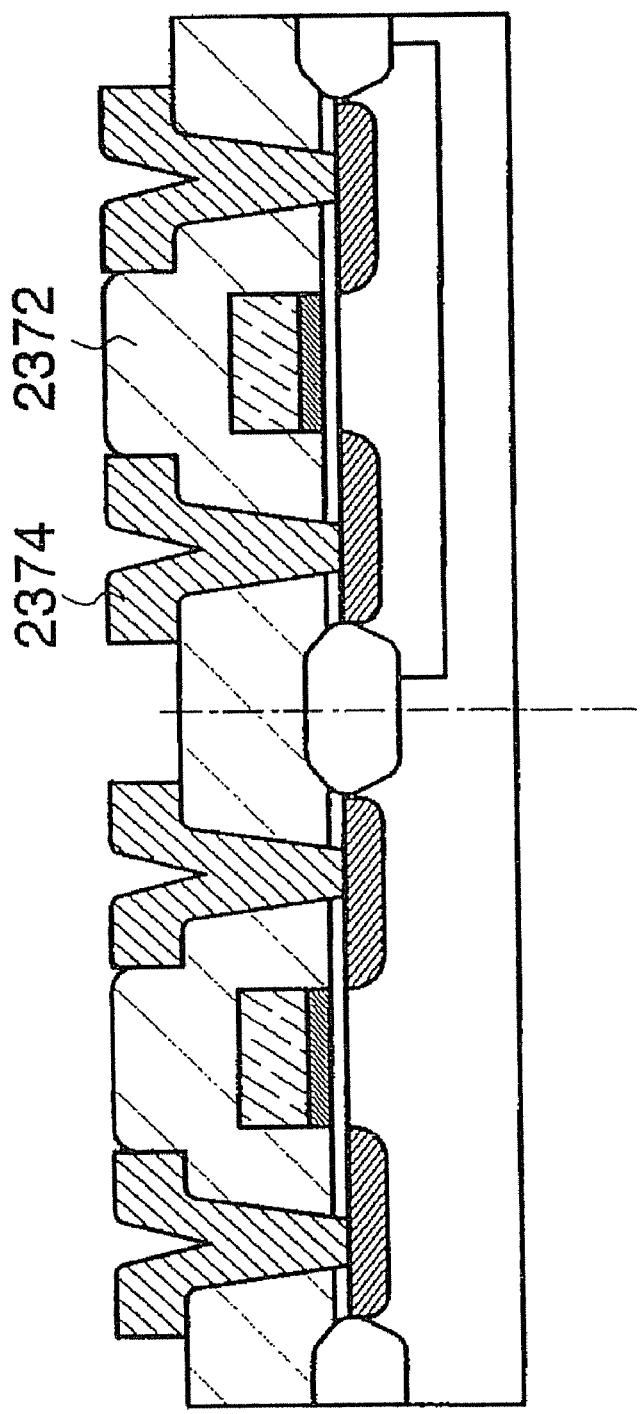
FIG. 14 is a diagram illustrating an example of a manufacturing method of a semiconductor device of the present invention.

In FIG. 13B, by introducing the impurity element, impurity regions 2352 which form source and drain regions and a channel formation region 2350 are formed in the region 2306.

Next, a resist mask 2366 is selectively formed so as to cover the region 2306. Then, the region 2304 is doped with an impurity element, using the resist mask 2366 and the gate electrode 2340 as masks, thereby forming impurity regions (see FIG. 13C). As the impurity element, an impurity element imparting n-type conductivity or an impurity element imparting p-type conductivity is used. As the n-type impurity element, phosphorus (P), arsenic (As), or the like can be used. As the p-type impurity element, boron (B), aluminum (Al), gallium (Ga), or the like can be used. Here, an impurity element (e.g., boron (B)) which has different conductivity from the impurity element introduced into the region 2306 in FIG. 13B is introduced. As a result, impurity regions 2370 which form source and drain regions and a channel formation region 2368 are formed in the region 2304.

Next, a second insulating film 2372 is formed so as to cover the insulating films 2332 and 2334, and the gate electrodes 2340 and 2342. Wirings 2374 which are electrically connected to the impurity regions 2370 and 2352 formed in the regions 2304 and 2306 respectively are formed over the second insulating film 2372 (see FIG. 14).

The second insulating film 2372 can be formed of either a single layer or a stacked-layer structure by a CVD method, a sputtering method, or the like, using an insulating film containing oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as DLC (Diamond-Like Carbon); an organic material such as epoxy, polyimide, polyamide, polyvinyl phenol, benzocyclobutene, or acrylic; and/or a siloxane material such as siloxane resin. Note that the siloxane material corresponds to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) is used. As a substituent, a fluoro group can also be used. Alternatively, an organic group containing at least hydrogen and a fluoro group may be used as a substituent.

The wirings 2374 are formed of a single layer or a stacked layer using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component by a CVD method, a sputtering method, or the like. An alloy material containing aluminum as its main component corresponds to a material which contains aluminum as its main component and which also contains nickel, or an alloy material which contains aluminum as its main component and which also contains nickel and one or both of carbon and silicon, for example. The wirings 2374 preferably employ, for example, a stacked-layer structure of a barrier film, an aluminum-silicon (Al—Si) film, and a barrier film, or a stacked-layer structure of a barrier film, an aluminum-silicon (Al—Si) film, a titanium nitride film, and a barrier film. Note that a barrier film corresponds to a thin film formed by using titanium, a nitride of titanium, molybdenum, or a nitride of molybdenum. Aluminum and aluminum silicon which have low resistance and are inexpensive are optimal materials for forming the wirings 2374. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film is reduced, so that preferable contact with the crystalline semiconductor film can be obtained.

Note that a structure of a transistor for forming a part of a semiconductor device of the present invention is not limited to the illustrated structure. For example, a structure of a transistor such as an inverted staggered structure and a FinFET structure can be used. By using a FinFET structure, a short-channel effect associated with miniaturization of a transistor size can be suppressed, which is preferable.

Note that this embodiment mode can be freely combined with any of the other embodiment modes in this specification.

Embodiment Mode 6

This embodiment mode will describe a manufacturing method of a semiconductor device which is different from the above embodiment modes. A transistor in the present invention can also be formed of a MOS transistor provided by a different manufacturing method from the MOS transistor using the single crystalline substrate which is described in the above embodiment mode.

This embodiment mode will typically describe a p-channel TFT (also referred to as a "Pch-TFT") and an n-channel TFT (also referred to as an "Nch-TFT") which form an inverter or the like, as a circuit for forming a part of a semiconductor device. Hereinafter, a manufacturing method of a semiconductor device will be described using cross-sectional views shown in FIGS. 15A to 15C, 16A to 16C, 17A to 17C, and 18A and 18B.

First, an insulating film is formed over a substrate 2600. Here, single crystalline Si having n-type conductivity is used for the substrate 2600, and an insulating film 2602 and an insulating film 2604 are formed over the substrate 2600 (see FIG. 15A). For example, a silicon oxide ($SiO_x$) film is formed as the insulating film 2602 with heat treatment on the substrate 2600, and a silicon nitride ($SiN_x$) film is formed over the insulating film 2602 by using a CVD method.

In addition, any semiconductor substrate can be used as the substrate 2600. For example, a single crystalline Si substrate having n-type or p-type conductivity, a compound semiconductor substrate (e.g., GaAs substrate, InP substrate, GaN substrate, SiC substrate, sapphire substrate, or ZnSe substrate), an SOI (Silicon On Insulator) substrate manufactured by a bonding method or a SIMOX (Separation by IMplanted OXygen) method, or the like can be used.

In addition, the insulating film 2604 may be provided by nitriding the insulating film 2602 by high-density plasma treatment after the insulating film 2602 is formed. Note that the insulating film provided over the substrate 2600 may be formed of a single layer or a stacked-layer structure of three or more layers.

Figure 15A:
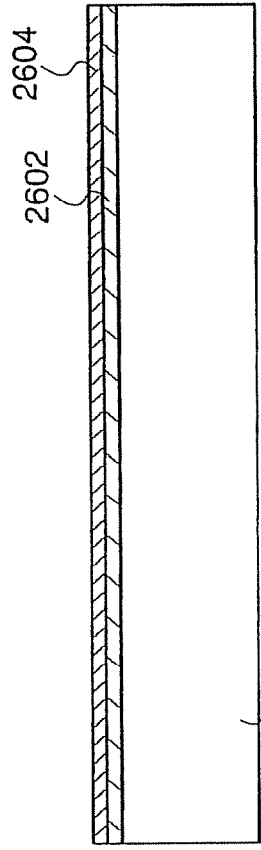
FIGS. 15A to 15C are diagrams illustrating an example of a manufacturing method of a semiconductor device of the present invention.
Figure 15B:
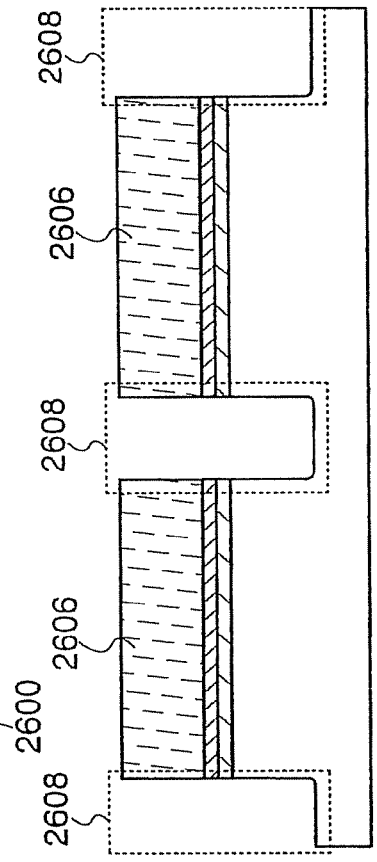

Next, a pattern of resist masks 2606 is selectively formed over the insulating film 2604, and etching is selectively performed using the resist masks 2606 as masks, thereby forming depressions 2608 selectively in the substrate 2600 (see FIG. 15B). The etching of the substrate 2600 and the insulating films 2602 and 2604 can be performed by dry etching utilizing plasma.

Figure 15C:
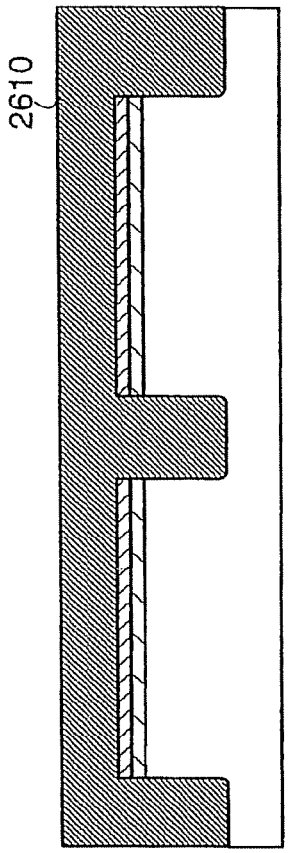

Next, after the pattern of the resist masks 2606 is removed, an insulating film 2610 is formed so as to fill the depressions 2608 formed in the substrate 2600 (see FIG. 15C).

The insulating film 2610 is formed using an insulating material such as silicon oxide, silicon nitride, silicon oxynitride ($SiO_xN_y$) (x>y>0), or silicon nitride oxide ($SiN_xO_y$) (x>y>0) by a CVD method, a sputtering method, or the like. Here, a silicon oxide film is formed as the insulating film 2610 by using a TEOS (Tetra-Ethyl-Ortho Silicate) gas by a normal-pressure CVD method or a low-pressure CVD method.

Next, a surface of the substrate 2600 is exposed by performing grinding treatment, polishing treatment, or CMP (Chemical Mechanical Polishing) treatment. Here, when the surface of the substrate 2600 is exposed, regions 2612 and 2613 are each provided between insulating films 2611 formed in the depressions 2608 in the substrate 2600. Note that the insulating films 2611 are formed by removing the insulating film 2610 formed on the surface of the substrate 2600, by grinding treatment, polishing treatment, or CMP treatment. Then, an impurity element having p-type conductivity is selectively introduced, thereby forming a p-well 2615 in the region 2613 in the substrate 2600 (see FIG. 16A).

As the p-type impurity element, boron (B), aluminum (Al), gallium (Ga), or the like can be used. Here, boron (B) is introduced as the impurity element into the region 2613.

Note that although an impurity element is not introduced into the region 2612 since the semiconductor substrate having n-type conductivity is used as the substrate 2600 in this embodiment mode, an n-well may be formed in the region 2612 by introducing an n-type impurity element. As the n-type impurity element, phosphorus (P), arsenic (As), or the like can be used.

In the case where a semiconductor substrate having p-type conductivity is used, an n-type impurity element may be introduced only into the region 2612 so as to form an n-well, not into the region 2613.

Figure 16A:
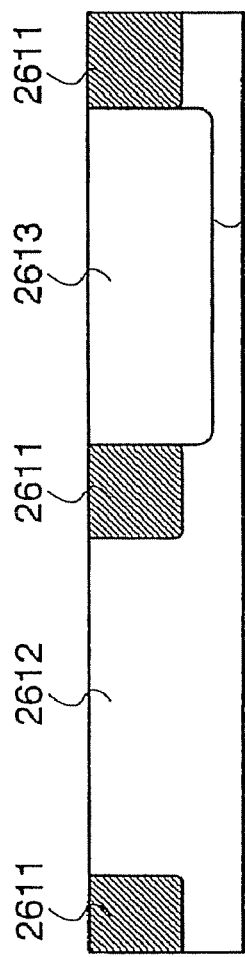
FIGS. 16A to 16C are diagrams illustrating an example of a manufacturing method of a semiconductor device of the present invention.
Figure 16B:
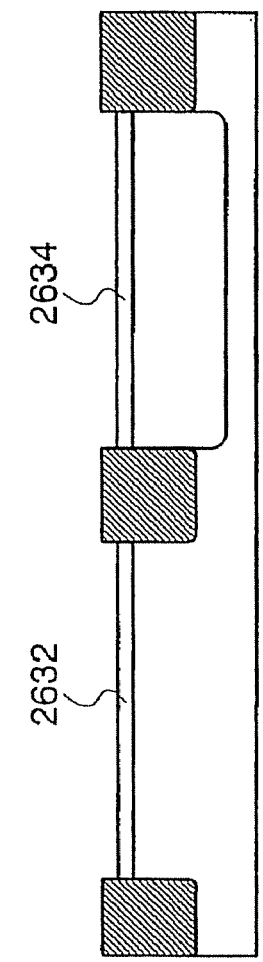

Next, insulating films 2632 and 2634 are formed on the surfaces of the regions 2612 and 2613 respectively in the substrate 2600 (see FIG. 16B).

Each of the insulating films 2632 and 2634 can be formed of a silicon oxide film by oxidizing each surface of the regions 2612 and 2613 in the substrate 2600 with heat treatment, for example. Alternatively, each of the insulating films 2632 and 2634 can be formed of a stacked-layer structure with a silicon oxide film and a film containing oxygen and nitrogen (silicon oxynitride film) by forming the silicon oxide film by a thermal oxidation method and then nitriding the surface of the silicon oxide film by nitridation treatment.

Further alternatively, as described above, the insulating films 2632 and 2634 may be formed using plasma treatment. For example, by performing oxidation treatment or nitridation treatment by high-density plasma treatment on the surfaces of the regions 2612 and 2613 in the substrate 2600, silicon oxide ($SiO_x$) films or silicon nitride ($SiN_x$) films are formed as the insulating films 2632 and 2634. Alternatively, after oxidation treatment is performed on the surfaces of the regions 2612 and 2613 by high-density plasma treatment, nitridation treatment may be performed by performing high-density plasma treatment again. In this case, silicon oxide films are formed on the surfaces of the regions 2612 and 2613, and silicon oxynitride films are formed on the silicon oxide films, so that each of the insulating films 2632 and 2634 is formed as a film in which the silicon oxide film and the silicon oxynitride film are stacked. Further alternatively, after silicon oxide films are formed on the surfaces of the regions 2612 and 2613 by a thermal oxidation method, oxidation treatment or nitridation treatment may be performed by high-density plasma treatment.

Note that the insulating films 2632 and 2634 formed over the regions 2612 and 2613 in the substrate 2600 function as gate insulating films in the transistors to be completed later.

Figure 16C:
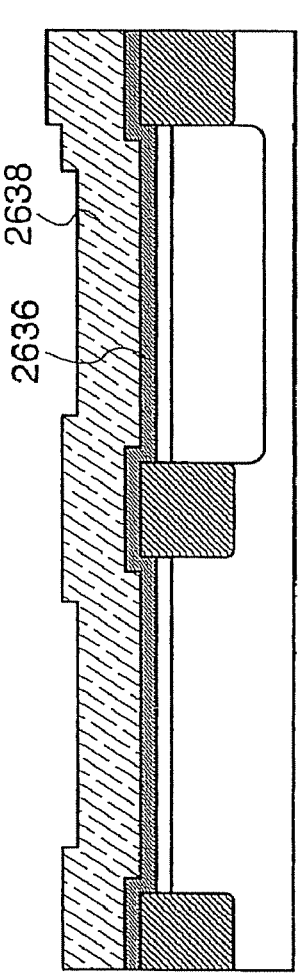

Next, conductive films are formed so as to cover the insulating films 2632 and 2634 formed over the regions 2612 and 2613 in the substrate 2600 (see FIG. 16C). Here, a conductive film 2636 and a conductive film 2638 are stacked sequentially as the conductive film. Needless to say, the conductive film may also be formed of a single-layer or staked-layer structure including three or more layers.

The conductive films 2636 and 2638 can be formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, a metal nitride film obtained by nitriding the element can also be used. Further alternatively, a semiconductor material typified by polycrystalline silicon doped with an impurity element such as phosphorus can be used.

Here, the conductive film is a stacked-layer structure formed by forming the conductive film 2636 using tantalum nitride and forming the conductive film 2638 using tungsten thereover. Alternatively, a single-layer or stacked-layer film of tantalum nitride, tungsten nitride, molybdenum nitride, or titanium nitride can be used as the conductive film 2636, and a single-layer or stacked-layer film of tungsten, tantalum, molybdenum, or titanium can be used as the conductive film 2638.

Figure 17A:
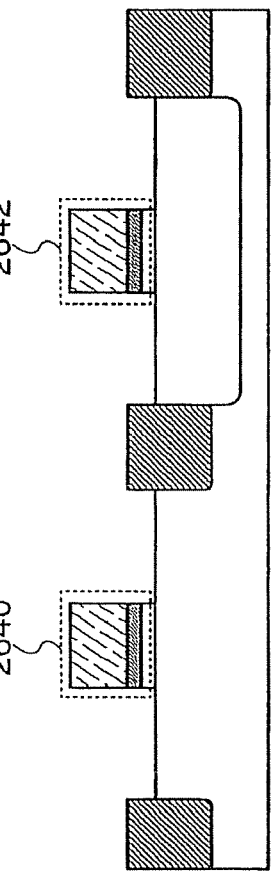
FIGS. 17A to 17C are diagrams illustrating an example of a manufacturing method of a semiconductor device of the present invention.

Next, by selectively etching and removing the conductive films 2636 and 2638 which are stacked, the conductive films 2636 and 2638 are partially left over the regions 2612 and 2613 in the substrate 2600 to form conductive films 2640 and 2642 each functioning as a gate electrode (see FIG. 17A). In addition, here, surfaces of parts of the regions 2612 and 2613 which are not overlapped with the conductive films 2640 and 2642 are exposed in the substrate 2600.

Specifically, in the region 2612 in the substrate 2600, a part of the insulating film 2632 formed under the conductive film 2640, which is not overlapped with the conductive film 2640 is selectively removed so that end portions of the conductive film 2640 and the insulating film 2632 are roughly aligned with each other. In the region 2613 in the substrate 2600, a part of the insulating film 2634 formed under the conductive film 2642, which is not overlapped with the conductive film 2642 is selectively removed so that end portions of the conductive film 2642 and the insulating film 2634 are roughly aligned with each other.

In this case, parts of the insulating films and the like which are not overlapped with the conductive films 2640 and 2642 may be removed at the same time as the formation of the conductive films 2640 and 2642; or may be removed after forming the conductive films 2640 and 2642, by using the remaining resist mask or the conductive films 2640 and 2642 as masks.

Figure 17B:
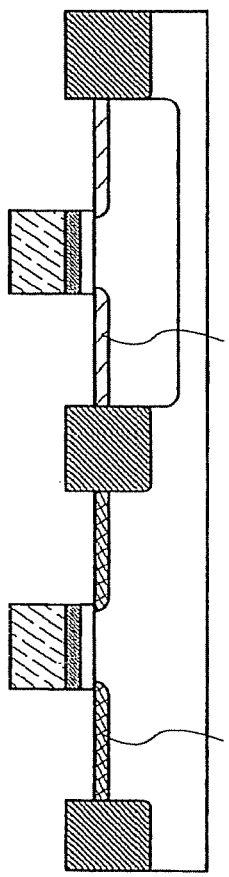

Next, an impurity element is selectively introduced into the regions 2612 and 2613 in the substrate 2600 (see FIG. 17B). Here, an impurity element imparting n-type conductivity is selectively introduced at a low concentration into the region 2613 by using the conductive film 2642 as a mask, while an impurity element imparting p-type conductivity is selectively introduced at a low concentration into the region 2612 by using the conductive film 2640 as a mask. As the impurity element imparting n-type conductivity, phosphorus (P), arsenic (As), or the like can be used. As the impurity element imparting p-type conductivity, boron (B), aluminum (Al), gallium (Ga), or the like can be used.

Next, sidewalls 2654 are formed in contact with side surfaces of the conductive films 2640 and 2642. Specifically, a film containing an inorganic material such as silicon, an oxide of silicon, or a nitride of silicon, or a film containing an organic material such as an organic resin is formed of a single layer or a stacked layer by a plasma CVD method, a sputtering method, or the like. Then, the insulating film is selectively etched by anisotropic etching mainly in the perpendicular direction, such that the insulating film is formed in contact with the side surfaces of the conductive films 2640 and 2642. Note that the sidewalls 2654 are used as doping masks when LDD (Lightly Doped Drain) regions are formed. Further, here, the sidewalls 2654 are formed in contact with side surfaces of the insulating films formed under the conductive films 2640 and 2642 as well.

Figure 17C:
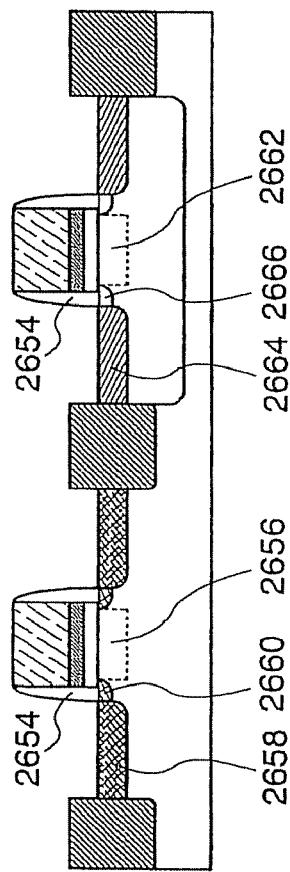

Next, an impurity element is introduced into the regions 2612 and 2613 in the substrate 2600 by using the sidewalls 2654 and the conductive films 2640 and 2642 as masks, thereby forming impurity regions functioning as source and drain regions (see FIG. 17C). Here, an impurity element imparting n-type conductivity is introduced at a high concentration into the region 2613 in the substrate 2600 by using the sidewalls 2654 and the conductive film 2642 as masks, while an impurity element imparting p-type conductivity is introduced at a high concentration into the region 2612 by using the sidewalls 2654 and the conductive film 2640 as masks.

As a result, in the region 2612 in the substrate 2600, impurity regions 2658 forming source and drain regions, low-concentration impurity regions 2660 forming LDD regions, and a channel formation region 2656 are formed. In the region 2613 in the substrate 2600, impurity regions 2664 forming source and drain regions, low-concentration impurity regions 2666 forming LDD regions, and a channel formation region 2662 are formed.

Note that in this embodiment mode, the introduction of the impurity element is performed under a condition in which the parts of the regions 2612 and 2613 in the substrate 2600 which are not overlapped with the conductive films 2640 and 2642 are exposed. Therefore, the channel formation regions 2656 and 2662 formed in the regions 2612 and 2613 in the substrate 2600 can be formed in a self-aligned manner with the conductive films 2640 and 2642.

Figure 18A:
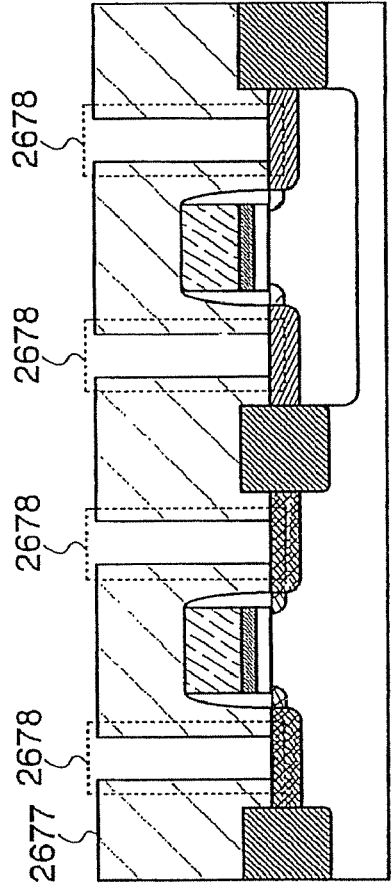
FIGS. 18A and 18B are diagrams illustrating an example of a manufacturing method of a semiconductor device of the present invention.

Next, a second insulating film 2677 is formed so as to cover the insulating films, the conductive films, or the like provided over the regions 2612 and 2613 in the substrate 2600, and openings 2678 are formed in the second insulating film 2677 (see FIG. 18A).

The second insulating film 2677 can be formed of a single-layer structure or a stacked-layer structure of an insulating film containing oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as DLC (Diamond-Like Carbon); an organic material such as epoxy, polyimide, polyamide, polyvinyl phenol, benzocyclobutene, or acrylic; and/or a siloxane material such as a siloxane resin, by a CVD method, a sputtering method, or the like. Note that the siloxane material corresponds to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) can be used. As a substituent, a fluoro group may also be used. Alternatively, as a substituent, an organic group containing at least hydrogen and a fluoro group may be used.

Figure 18B:
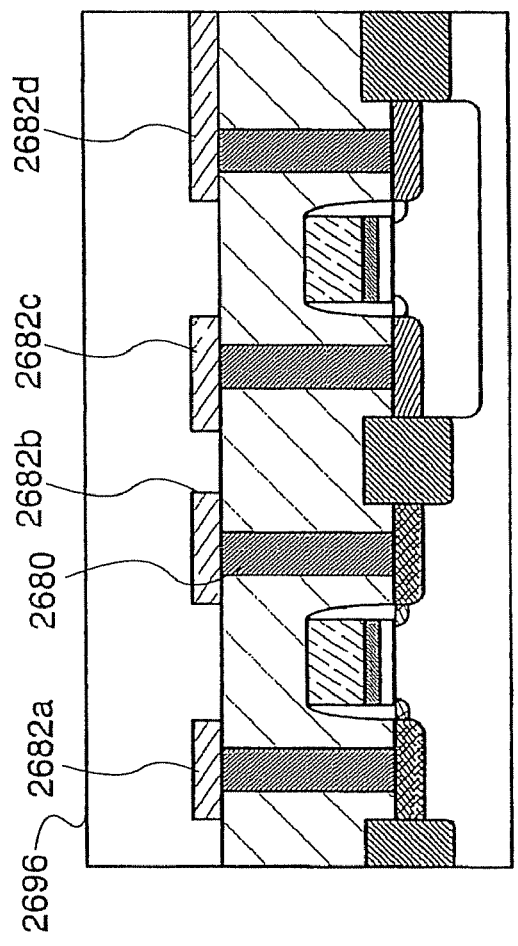
Figure 19A:
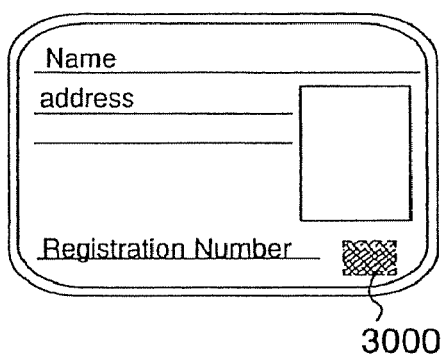
FIGS. 19A to 19F are views each illustrating an example of a usage pattern of a semiconductor device of the present invention.
Figure 19B:
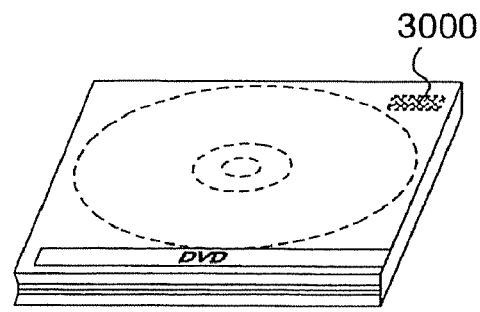
Figure 19C:
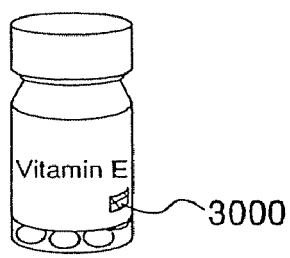
Figure 19D:
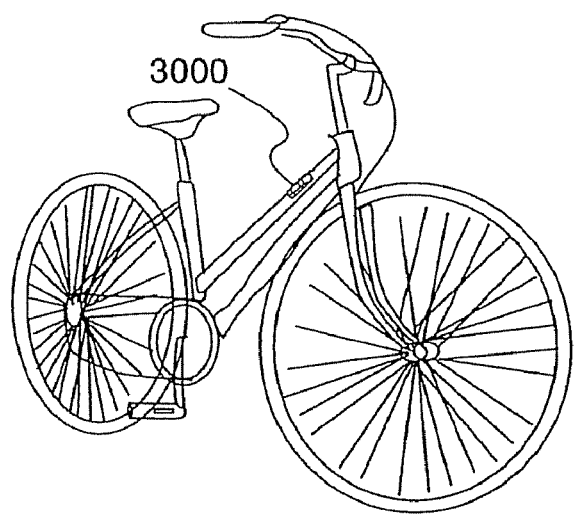
Figure 19E:
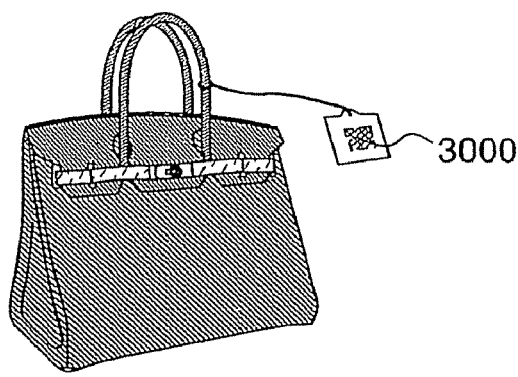
Figure 19F:
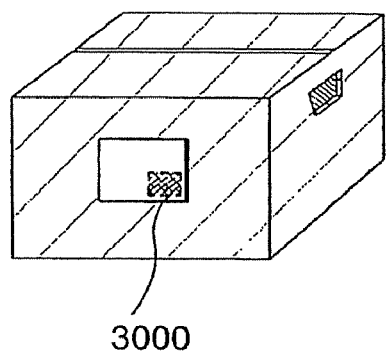

Next, conductive films 2680 are formed in the openings 2678 by using a CVD method, and conductive films 2682a to 2682d are selectively formed over the second insulating film 2677 so as to be electrically connected to the conductive films 2680 (see FIG. 18B).

Each of the conductive films 2680, and 2682a to 2682d is formed of a single layer or a stacked layer using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component by a CVD method, a sputtering method, or the like. An alloy material containing aluminum as its main component corresponds to a material which contains aluminum as its main component and which also contains nickel, or an alloy material which contains aluminum as its main component and which also contains nickel and one or both of carbon and silicon, for example. Each of the conductive films 2680, and 2682a to 2682d preferably employs, for example; a stacked-layer structure of a barrier film, an aluminum-silicon (Al—Si) film, and a barrier film, or a stacked-layer structure of a barrier film, an aluminum-silicon (Al—Si) film, a titanium nitride film, and a barrier film. Note that a barrier film corresponds to a thin film formed by using titanium, a nitride of titanium, molybdenum, or a nitride of molybdenum. Aluminum and aluminum silicon which have low resistance and are inexpensive are optimal materials for forming the conductive films 2680, and 2682a to 2682d. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film is reduced, so that preferable contact with the crystalline semiconductor film can be obtained. Here, the conductive films 2680 can be formed by selective growth of tungsten (W) using a CVD method.

Through the above-described steps, a semiconductor device provided with a p-channel transistor formed in the region 2612 and an n-channel transistor formed in the region 2613 in the substrate 2600 can be obtained.

Note that a structure of a transistor for forming a transistor of the present invention is not limited to the illustrated structure. For example, a structure of a transistor such as an inverted staggered structure and a FinFET structure can be used. By using a FinFET structure, a short-channel effect associated with miniaturization of a transistor size can be suppressed, which is preferable.

Note that this embodiment mode can be freely combined with any of the other embodiment modes in this specification.

Embodiment Mode 7

A method of using a semiconductor device 3000 functioning as an RFID tag, which is described in the above embodiment mode, will be described with reference to FIGS. 19A to 19F.

A semiconductor device can be applied to a wide range of purposes. For example, the semiconductor device can be attached to bank notes, coins, securities, bearer bonds, certificates (such as a driver's license or a residence card, see FIG. 19A), packaging containers (such as package paper or a bottle, see FIG. 19C), recording media (such as DVD software or a video tape, see FIG. 19B), vehicles (such as a bicycle, see FIG. 19D), personal belongings (such as a bag or glasses), foods, plants, animals, human bodies, clothes, general merchandise, electronic appliances, luggage tags (see FIGS. 19E and 19F), and the like. The electronic appliances include a liquid crystal display device, an EL display device, a television device (also referred to as a TV, a TV receiver, or a television receiver), a mobile phone, and the like.

The semiconductor device 3000 of the present invention has a memory element of the present invention and is fixed to a product by mounting the device onto a printed board, attaching the device to a surface of the product, or embedding the device inside the product. For example, if the product is a book, the device is fixed to the book by embedding the device inside paper, and if the product is a package made of an organic resin, the device is fixed to the package by embedding the device inside the organic resin. Since the semiconductor device 3000 of the present invention can be compact, thin, and lightweight, it does not degrade the quality of design even after the device is fixed to a product. When the semiconductor device 3000 of the present invention is provided to bank notes, coins, securities, bearer bonds, certificates, and the like, an authentication function can be provided. With the use of this authentication function, the forgery can be prevented. Further, when the semiconductor device of the present invention is attached to packaging containers, recording media, personal belongings, foods, clothes, general merchandise, electronic appliances, and the like, systems such as an inspection system can be made efficient.

Note that this embodiment mode can be freely combined with any of the other embodiment modes in this specification.

This application is based on Japanese Patent Application serial No. 2006-181966 filed in Japan Patent Office on Jun. 30, 2006, the entire contents of which are hereby incorporated by reference.

What is claimed is:

1. A clock synchronization circuit comprising:
a latch circuit;
a circuit configured to generate a reset signal by comparing an input signal to the latch circuit with an output signal from the latch circuit;
a first clock generation circuit configured to output a first clock signal;
a clock counter circuit configured to count the first clock signal;
a frequency divider circuit configured to frequency-dividing a signal outputted from the clock counter circuit; and
a second clock generation circuit configured to output a second clock signal in accordance with a signal outputted from the frequency divider circuit,
wherein the clock counter circuit is configured to reset a counter value obtained by counting the first clock signal in accordance with the reset signal.

2. The clock synchronization circuit according to claim 1, wherein the first clock generation circuit comprises a ring oscillator.

3. The clock synchronization circuit according to claim 1, wherein the first clock generation circuit comprises a crystal oscillator.

4. The clock synchronization circuit according to claim 1, wherein the circuit configured to generate the reset signal comprises a NOT circuit and an AND circuit, wherein a first input terminal of the AND circuit is electrically connected to an output terminal of the latch circuit, and wherein a second input terminal of the AND circuit is electrically connected to an input terminal of the latch circuit through the NOT circuit.

5. A semiconductor device comprising:
an antenna for transmitting and receiving a signal to and from a reader/writer by wireless communication;
a latch circuit configured to latch the signal from the reader/writer;
a circuit configured to generate a reset signal by comparing an input signal to the latch circuit with an output signal from the latch circuit;
a first clock generation circuit configured to output a first clock signal;
a clock counter circuit configured to count the first clock signal;
a frequency divider circuit configured to frequency-dividing a signal outputted from the clock counter circuit; and
a second clock generation circuit configured to output a second clock signal in accordance with a signal outputted from the frequency divider circuit,
wherein the clock counter circuit is configured to reset a counter value obtained by counting the first clock signal in accordance with the reset signal.

6. The semiconductor device according to claim 5, wherein the first clock generation circuit comprises a ring oscillator.

7. The semiconductor device according to claim 5, wherein the first clock generation circuit comprises a crystal oscillator.

8. The semiconductor device according to claim 5, wherein the circuit configured to generate the reset signal comprises a NOT circuit and an AND circuit, wherein a first input terminal of the AND circuit is electrically connected to an output terminal of the latch circuit, and wherein a second input terminal of the AND circuit is electrically connected to an input terminal of the latch circuit through the NOT circuit.

* * * * *